(12) United States Patent
Kudoh et al.

(10) Patent No.: US 7,792,861 B2
(45) Date of Patent: Sep. 7, 2010

(54) ACCESS CONTROL SYSTEM AND METHODS

(75) Inventors: Michiharu Kudoh, Kamakura (JP);
Tomio Amano, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1088 days.

(21) Appl. No.: 11/457,805

(22) Filed: Jul. 15, 2006

(65) Prior Publication Data

US 2007/0179954 A1    Aug. 2, 2007

Related U.S. Application Data

(62) Division of application No. 09/948,286, filed on Sep. 7, 2001, now Pat. No. 7,409,390.

(30) Foreign Application Priority Data

Sep. 9, 2000    (JP) .............................. 2000-274040

(51) Int. Cl.
*G06F 17/30* (2006.01)
*G06F 7/00* (2006.01)

(52) U.S. Cl. .................................................. 707/786

(58) Field of Classification Search ...................... 707/8, 707/9, 102, 781, 783, 784, 785, 786, 787, 707/788; 709/208, 209, 210, 211, 229; 711/100, 711/101–154, 163, 164
See application file for complete search history.

(56) References Cited

U.S. PATENT DOCUMENTS 4,525,780 A * 6/1985 Bratt et al. .................. 711/163
5,050,074 A * 9/1991 Marca ........................... 707/8
5,173,939 A   12/1992 Abadi et al. ................... 707/9

(Continued)

FOREIGN PATENT DOCUMENTS

JP    08-161213    6/1996

OTHER PUBLICATIONS

Shaohua Deng, P., Fast Control in Object-Oriented Repetitive Access, Security Technology, 1994. Proceedings. Institute of Electrical and Electronics Engineers 28th Annual Conference on, Oct. 12-14, 1994, pp. 173-175.*

(Continued)

*Primary Examiner*—Greta L Robinson
(74) *Attorney, Agent, or Firm*—Ido Tuchman; Kenneth R. Corsello

(57) ABSTRACT

It is one object of the present invention to provide an access control system that employs an access control rule and that does not distinguish between data and the access control rule, so that the same flexible access control that is available for the data can also be provided for the access control rule.

An access control system comprises: an access controller 200 for, in accordance with the access request, employing an access control rule defining an access right for the object to determine whether or not access to the object should be permitted; and an object storage unit 500 for storing a set of access control rules as objects equivalent to common data objects, wherein, upon the receipt of a request to access an access control rule, the access controller 200 determines whether or not access to the access control rule should be permitted.

20 Claims, 19 Drawing Sheets

U.S. PATENT DOCUMENTS

| | | | |
|---|---|---|---|
| 5,999,978 A | 12/1999 | Angal et al. | 709/229 |
| 6,085,191 A | 7/2000 | Fisher et al. | 707/9 |
| 6,236,996 B1 | 5/2001 | Bapat et al. | 707/9 |
| 6,237,036 B1 | 5/2001 | Ueno et al. | 709/225 |
| 6,820,082 B1 | 11/2004 | Cook et al. | 707/9 |
| 6,859,805 B1 * | 2/2005 | Rogers et al. | 707/9 |

OTHER PUBLICATIONS

Bertino, E., Protecting XML Documents, Computer Software and Applications Conference, 2000. COMPSAC 2000. The 24th Annual International, Oct. 25-27, 2000, pp. 132-133.*

H.M. Gladney, Access Control for Large Collections, ACM Transactions on Information Systems (TOIS), vol. 15, issue 2, Apr. 1997, pp. 154-194.

Jajodia et al., A Unified Framework for Enforcing Multiple Access Control Policies, International Conference on Management of Data, Proceedings of the 1997 ACM SIGMOD Inter. Conf. on Management of Data, pp. 474-485.

Luigi Giuri, Role-Based Access Control in Java, Symposium on Access Control Models and Technologies, Proceedings of the 3rd ACM Workshop on Role-Based Access Control, 1998, pp. 91-100.

Jaeger et al., Requirements of Role-Based Access Control for Collaborative Systems, Symposium on Access Control Models and Technologies, Proceedings of the 1st ACM Workshop on Role-Based Access Control, Article 16, 1996, pp. II-53 through II-64.

Ferraiolo et al., A Role-Based Access Control Model and Reference Implementation with a Corporate Internet, ACM Transactions on Information and System Security (TISSEC), vol. 2, issue 1, Feb. 1999, pp. 34-64.

* cited by examiner

| Data type | Data structure | Definition |
|---|---|---|
| Tagged object | Access control identification name tag | Indicates an identification name (object ID) for an access control tagged object that represents access control for a local tagged object |
| | Access enabled subject tag | Indicates an access subject (user name, system process number, etc.) that generates a local tagged object. Holds an access right for all the access types of tagged objects |
| | Arbitrary tag | Indicates an arbitrary tag |
| Access control tagged object | Access control identification name tag | Ditto |
| | Access enabled subject tag | Ditto |
| | Access target tag | Tag name for access target object |
| | Access subject tag | Identifier, such as a user or a group that carries out an access or an access process |
| | Access type tag | Process type, such as reading, changing, adding, generating or deleting, accompanied by the access target |
| | Access flag tag | "permitted" or "inhibited" |
| | Access condition tag | Evaluation available expression |
| Un-tagged object | Arbitrary | Has an arbitrary form, and does not internally include a tag expression. GIF file is an example |

Fig. 3

| Data flow direction | Definition of interface |
| --- | --- |
| 100→200 | Access request |
| 200→100 | Access flag (represents process results), object (represents a processed object) |
| 200→300 | Object identifier (represents an access target) |
| 200→500 | Object (represents a processed object) |
| 300→200 | Access flag (represents a target object and an access control tagged object) |
| 300→500 | Object identifier (represents an access target) |
| 500→300 | Object (represents a target object and an access control tagged object) |
| 300→400 | Object identifier (represents an access target and an access control tagged object) |
| 400→300 | Object (represents an access control tagged object) |
| 200→600 | Object, access target, access type, access flag |
| 600→200 | Object (represents a processed object) |

Fig. 4

| Data entry | Definition of interface |
|---|---|
| Object identifier | Identifier of an un-tagged object |
| Access subject | Access subject |
| Access type | Access type |
| Access control tagged object identifier | Access control rule for an object identifier |
| Effective period | Effective period for an entry in an object correlation table |
| History | Flag indicating the history of an entry |

Fig. 6

| Access type | Process script program name |
|---|---|
| Access type 1 | Access type 1 program |
| Access type 2 | None |
| Access type 3 | Access type 3 program |

Fig. 7

| Access type | Destination of result object |
|---|---|
| Access type 1 | Access request unit |
| Access type 2 | Access controller |
| Access type 3 | Object manager, object storage unit |

Fig. 8

| Access type | Process script program name |
|---|---|
| Generation | Tagged object generation program |

Fig. 15

| Access type | Transmission destination of a processed object |
|---|---|
| Generation | Object storage unit |

Fig. 16

| Access type | Transmission destination of a processed object |
|---|---|
| Deleting | Object storage unit |

Fig. 17

Object identification name : X001.xml

```
< access control identification name > Policy.xml </access control identification name >
< employee >
  < name > Alice </name >
  < employee number > 112233 </employee number >
  < salary > 100,000 </salary >
</employee >
```

Object identification name : Policy.xml

```
< access control destination > Admin.xml </access control destination >
< access control >
  < access target > employee </access target >
  < access subject > personnel section member </access subject >
  < access type > reading </access type >
  < access flag > permitted </access flag >
  < access permission condition > </access permission condition >
</access control >
```

Object identification name : Admin.xml

```
< access enabled subject > personnel system manager </access enabled subject >
< access control >
  < access target > access control </access target >
  < access subject > personnel section manager </access subject >
  < access type > change </access type >
  < access flag > permitted </access flag >
  < access permission condition > </access permission condition >
</access control >
```

Fig. 20

Object identification name : Policy.xml

```
< access control identification name > Admin1.xml </access control idenfitication name >
< access control identification name > Admin2.xml </access control identification name >
< access control >
  < access target > employee </access target >
  < access subject > personnel section member </access subject >
  < access type > reading </access type >
  < access flag > permitted </access flag >
  < access permission condition > </access permission condition >
</access control >
```

Object identification name : Admin1.xml

```
< access enabled subject > personnel system manager </access enabled subject >
< access control >
  < access target > access flag </access target >
  < access subject > inspection section manager </access subject >
  < access type > change </access type >
  < access flag > permitted </access flag >
  < access permission condition > </access permission condition >
</access control >
```

Object identification name : Admin2.xml

```
< access enabled subject > personnel system manager </access enabled subject >
< access control >
  < access target > access control </access target >
  < access subject > personnel section manager </access subject >
  < access type > change </access type >
  < access flag > permitted </access flag >
  < access permission condition > </access permission condition >
</access control >
```

Fig. 21

ACCESS CONTROL SYSTEM AND METHODS

This application is a divisional of U.S. patent application Ser. No. 09/948,286 for ACCESS CONTROL SYSTEM AND METHODS, filed Sep. 7, 2001 now U.S. Pat. No. 7,409,390.

FIELD OF THE INVENTION

The present invention relates to access control, and in particular to access control, provided for an access control rule, that enables the flexible setting of access control rules.

BACKGROUND ART

From the viewpoint of computer security, generally, access control of resources that serve as information sources has long been exercised (such as data file or directory). For this access control, the access control rule applied is used to limit the users who are permitted to access predetermined computer resources and to specify which contents users can access (the type of executable process). Based on this rule, an access request submitted by a user is evaluated and a determination is made as to whether access should be granted or refused. a specific example of access control is provided by UNIX, one of the OSs (Operating Systems). In UNIX, access control is implemented by using file system permissions settings and user IDs. Aside from a permission mode entry, a file system permissions setting has three subject parts: owner, owner's group, and all others. These subject parts are further broken down into permissions types used to permit or inhibit the reading of a file (read), the writing of a file (write), and the execution of a file (execute).

Only a root user who owns all of these rights can exercise them without any limitations. In addition, normally only the root user, the super user who possesses all the rights, can access all data and is not limited to only that data which is provided for a user ID. This is determined by the access control rule that is the most significant and fixed. The root user can not assign only a part of his or her rights to another user. Thus, when a strong right that is owned by the root user is to be provided for another user, all the root rights must be allocated.

As another example of access control, application software can control access to an object managed by the software. For example, Notes, by Lotus, is well known as application software that can flexibly control access for multiple classes of objects, such as a database, a view, a form, a document.

The right to change the access control rule employed by Notes is permanently provided only for the role of database manager. That is, a user need only be permitted to assume the role of database manager, so that essentially, everybody can change the access control rule. However, this application software can not provide access control whereby the alteration right is provided only for certain parts of the object classes, but is not provided for others.

As in the above described example, a conventional access control system only provides, for a user, either all access rights afforded by an access control rule, or absolutely no access rights.

Conventionally, BJS is known as a technique concerning a language used to write the access control rule. According to BJS, a rule for controlling access to an access control rule can be managed based on an administration right. There are two types of administration rights: "administer" and "adm-access". The administer can prepare all the access control rules, including the administration right, and the adm-access can prepare access control rules including rights ("select" and "create") other than the administer rights and the adm-access right. For example, assume that the following access control rule exists for Alice who has the adm-access right.

<Alice, select, adm-access, strong, table1, Trent>

This access control rule means that Alice can generate or delete an arbitrary access control rule so far as the "select" operation of "table1" is concerned. For example, <Employee, select, +, table1, Alice, strong>can be prepared, which is a rule indicating that Employee holds a right concerning the "select" operation for "table1", and that the creator of this right is Alice. As another example, assume that the following access control rule exists for Bob who holds the "administer" right.

<Bob, select, administer, strong, table1, Trent>

This access control rule means that Bob can assign the right for preparation of the access control rule to another person, so far as the "select" operation of "table1" is concerned. For example, <Carol, select, adm-access, strong, table1, Bob>can be prepared, which is a rule indicating that, so far as the "select" operation for "table1" is concerned, Carol has the right to prepare an access control rule for this "select" operation, and that the creator of this rule is Bob.

By using BJS, a rule for controlling access to an access control rule can be written in the above described manner. It should be noted that different formats are employed for writing an access control rule and the administration right, which is a rule for controlling access to an access control rule.

PROBLEMS TO BE SOLVED BY THE INVENTION

As is described above, according to the common access control exercised by operating systems and application software, a user either receives all the access rights permitted by access control rules, or receives no access rights therefor.

Thus, it is impossible for the access right for the access control rule to be permitted with limits, e.g., only the addition of a specific access control rule is provided for a specific user. That is, it is impossible for only one part of the access rights for an access control rule to be assigned.

Further, for security, it is not preferable that all the access rights for access control rules be provided for many users.

In addition, when a system is changed, the management of the becomes more complicated.

As is described above, by using BJS, a rule for controlling access to an access control rule can be written. However, according to BJS, a different format is used when writing an administration right than is used when writing an access control rule, and the contents of an administration right must be determined to be the counterpart of an object ("table", etc.) that is subject to the access control rule controlled by the administration right.

Therefore, it is impossible to set the right the contents of which relative to the access control rule are separated from the object, e.g., a right ("read", etc.) for referring to an access control rule designated for a specific object.

As is described above, flexible access control can also not be exercised when access of the access control rule is to be controlled using BJS.

When the problems presented by conventional access control can be resolved, and when an arbitrary portion of rights relative to access control rules can be provided for a user, a more usable and convenient access control system can be provided.

Further, when an addition to, a change or the deletion of an access control rule can be flexibly written as a rule for controlling access to the access control rule, a more usable and convenient access control system can be provided.

It is, therefore, one object of the present invention to provide an access control system that employs a set of access control rules and that does not distinguish between data and the access control rules, so that the same flexible access control that is available for the data can also be provided for the access control rule.

Therefore, access control can be easily exercised to provide, for a user, an arbitrary portion of the access rights for an access control rule. Further, an addition to, a change and the deletion of an access control rule can be easily performed.

SUMMARY OF THE INVENTION

Thus, the present invention provides an access control system, for exercising access control upon the receipt of a request to access an object that is an information resource, comprises: an access request determination unit for, in accordance with the access request, employing an access control rule defining an access right for the object to determine whether or not access to the object should be permitted; and an object storage unit for storing a set of access control rules as objects equivalent to common data objects, wherein, upon the receipt of a request to access an access control rule, the access request determination unit determines whether or not access to the access control rule should be permitted.

That is, the access control rule can be managed without distinguishing between it and a general data object.

Upon the receipt of a request to access a predetermined object, including the access control rule, the access request determination unit extracts, from the object storage unit, the predetermined object and an object that represents an access control rule for the predetermined object, and determines, based on the obtained access control rule, whether access to the predetermined object should be permitted.

That is, the access request determination unit extracts, from the object storage unit, two objects, the target object and the access control rule, and employs these two objects to determine whether the access request should be granted. A set of access control rules stored as objects in the object storage unit includes an access control rule that defines an access right for another access control rule stored in the object storage unit.

That is, a double structure can be employed, i.e., an access control rule for another access control rule can be an object for which an access request is requested, and can be controlled in accordance with a higher level access control rule.

An access control system further comprises: an object correlation manager for managing a correlation between an object for which an access request is issued and an access control rule for the object.

Specifically, the object correlation manager obtains and manages correlation information for a specific object that represents a correlation with the access control rule. When an access request is issued for an object that is accompanied by the specific object and that does not represent a correlation with the access control rule, the access control rule is extracted, based on information stored by the object correlation manager for correlation with the access control rule, and can be used as an access control rule for an object that does not represent a correlation with the access control rule.

Information concerning the correlation between the object and the access control rule can be written using a tag that is added to the object.

According to the invention, another access control system can be provided. That is, an access control system, for exercising access control upon the receipt of a request to access a specific information resource, comprises: storage means, for storing an access control rule that defines an access right for the specific information resource and a higher level control rule that defines an access right for the access control rule; and determination means, for employing the higher level control rule, in accordance with a request to access the access control rule, to determine whether access to the access control rule should be permitted, wherein a higher level control rule for controlling access to another access control rule is included as the access control rule stored in the storage means.

That is, when an access control rule is one of the information resources that can also be an access request target, accordingly, a higher level control rule is considered to be merely another access control rule. Therefore, when the access control rule is written in a format that is used in common, and when another access control rule is defined as the control target, a higher level control rule can be prepared, and a double access control rule structure constructed.

As well as a general data object to which information is added designating an access control rule, the access control rules stored in the storage means can be written as objects that each include designation information specifying a higher level control rule that is to be used for access control.

This designation information can be presented by using the above tag.

An access control system further comprises: processing means, for generating, changing or deleting, in accordance with an access request that is granted by the determination means, the access control rule and the higher level control rule therefor.

Further, the higher level control rule can be a rule permitting one part of an access right for the access control rule to be provided for a specific subject.

According to the present invention, an additional access control system can be provided. Specifically, an access control system, for receiving a tagged object, having a tag that represents control information for data elements, and for exercising access control for the tagged object, comprises: access control rule storage means, for storing a set of access control rules each defining an access right for the tagged object; and an access request determination means, for employing an access control rule to determine, in accordance with the access request, whether access to the tagged object should be permitted, wherein the set of access control rules stored in the access control rule storage means are written as tagged objects, for which the tags each represent control information for controlling the elements of the access control rule, and wherein the access request determination means, in accordance with the access request for the access control rule, determines whether access to the access control rule, which is the tagged object, should be permitted.

That is, when the access control rule is written as a tagged object, the access control system can handle, without distinguishing between them, a general data object having a tag, such as an HTML file, and an access control rule.

An access control system further comprises: data object storage means, for storing a data object having a tag, a tagged object, or a data object having no tag, an un-tagged object, and the access request determination means, for determining whether access to the access control rule, which is either the tagged data object or the un-tagged data object, should be permitted.

An access control system further comprises: management means, for holding information concerning an access control rule for the tagged data object when an access request for the tagged data object is issued. When an access request is issued for the un-tagged data object, which accompanies the tagged data object, the access request determination means, based on information held by the management means, obtains an access control rule for the tagged data object, and based on the access control rule, determines whether access to the un-tagged data object should be permitted.

That is, data objects are sorted into tagged data objects and un-tagged data objects, and access to an un-tagged data object can be controlled by using the access control rule for a tagged data object.

According to the present invention, a server for receiving an access request from a client and for, in accordance with the access request, processing an object that is the target of the access request comprises: an access request determination unit, for determining, based on an access control rule defining an access right for the object, whether the accessing of the object should be permitted; and an object processor, for performing corresponding processing for the object in accordance with access permission granted by the access request determination unit; and an object storage unit for storing, as an object, the access control rule for the object, wherein the access request determination unit, in accordance with an access request for the access control rule, determines whether the accessing of the access control rule should be permitted.

That is, the server can be provided that performs the process for the object via the access control.

According to the invention, an access control method, for exercising access control upon the receipt of an access request for an object that is an information resource, comprises the steps of: receiving an access request for an access control rule that is an object; obtaining an access control rule defining an access right for the object targeted by the access request; and determining, based on the access control rule, whether the accessing of the object should be permitted.

That is, the access request for an access control rule as well as the general data object is received, and the access control therefor can be exercised.

According to the present invention, an access control method, for exercising access control upon the receipt of an access request for a tagged object, which has a tag that represents information for controlling elements of data, comprises the steps of: holding information for an access control rule for the tagged object upon the receipt of an access request for the tagged object; obtaining, upon the receipt of an access request for an un-tagged object, which accompanies the tagged object, the access control rule for the tagged object based on the information that is held at the step of holding the information concerning the access control rule; and employing the access control rule to determine whether the accessing of the un-tagged object should be permitted.

According to the present invention, an access control rule generation method, for generating an access control rule for controlling another access control relative to an access request for an object that is an information resource, comprises the steps of: receiving a request for generating an access control rule, and determining, based on the access control rule relative to the generation request, whether the generation request should be granted; and generating the access control rule, when the generation request is granted, in accordance with the generation request, and adding information to the access control rule that, relative to the generation request, designates the access control rule.

The present invention can be provided by preparing a program that permits a computer to perform processes that correspond to the individual steps of the access control method or the access control rule generation method, and thereafter either storing the program on a computer-readable storage medium or employing a program transmission apparatus to distribute the program.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 3 is a diagram showing the data structure of an access target object according to the embodiment.

FIG. 4 is a diagram for explaining the definition of an interface between elements according to the embodiment.

FIG. 6 is a diagram showing an example structure for an object correlation table according to the embodiment.

FIG. 7 is a diagram showing the relationship between the access type and a process script program executed by an access processor according to the embodiment.

FIG. 8 is a diagram showing an example rule defining the transmission destination of an object processed by the access processor according to the embodiment.

FIG. 15 is a diagram showing an example relationship between an access type and a process script program according to the embodiment.

FIG. 16 is a diagram showing an example rule for defining the transmission destination for an object that is generated by the access processor according to the embodiment.

FIG. 17 is a diagram showing an example rule for defining the transmission destination for an object (a Null object) that is deleted by the access processor according to the embodiment.

FIG. 20 is a diagram showing an example structure of an XML file stored in an XML data storage unit in the example in FIG. 19.

FIG. 21 is a diagram showing the state wherein an XML file, which is a new access control tagged object, is added to the state in FIG. 20.

DESCRIPTION OF THE SYMBOLS

Figure 1:
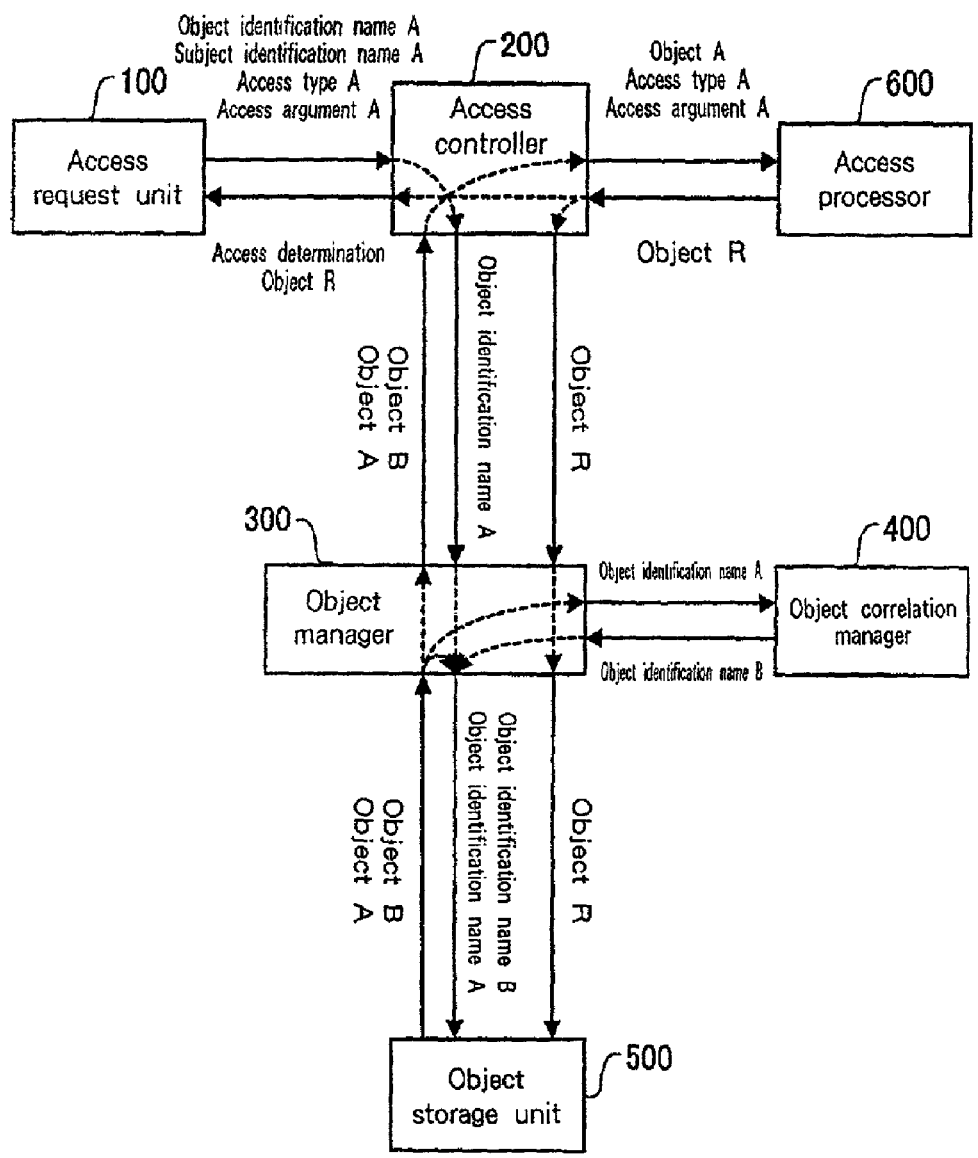
FIG. 1 is a block diagram for explaining the general structure of an access control system according to the embodiment.

100: Access request unit
200, 1300, 3200: Access controller
300: Object manager
400: Object correlation manager
500: Object storage unit
600: Access processor
1000, 3000, 4000: WEB server
1100, 3100: Transmission/reception unit
1200: XML-HTML converter
1400, 3300: XML data storage unit
2000: WEB browser
3400: Access control rule storage unit

DETAILED DESCRIPTION OF THE INVENTION

Preferred Embodiment

The preferred embodiment of the present invention will now be described while referring to the accompanying drawings. First, an overview of the invention will be given.

According to the invention, the concept of a tagged object is introduced in order to handle an object, which is a common access control target, and an access control rule, without discriminating between them. In this case, a tag is data representing control information for a data element, and is, for example, the unique name of the data element.

Thus, a tagged object is an object having a tag, the name of which can be used to refer to data. For example, the markup language HTML (Hypertext Markup Language) or XML (Extensible Markup Language) is an object.

In this invention, a set of access control rules are written as tagged objects. Further, general data objects are sorted into tagged objects and un-tagged objects, and access control is exercised in accordance with the written form of the objects. Thus, regardless of whether a tagged object is an access control rule or a data object, the same method can be employed to exercise access control for it.

FIG. 1 is a diagram for explaining the general configuration of an access control system according to this embodiment.

In FIG. 1, an access request unit 100 issues an access request, and an access controller 200, access request determination means, determines whether the accessing of an object that is an information resource should be permitted. An object manager 300 extracts an object or an access control rule from an object storage unit 500, and transmits the object or the access control rule to the access controller 200. Further, in order to supplement the object or the access control rule extracted from the object storage unit 500, an object correlation manager 400 can be employed as needed. The object correlation manager 400 manages the state of the object before the object is extracted from the object storage unit 500, or before it is stored in the object storage unit 500. Especially, the object correlation manager 400 has a function for temporarily storing information, such as an access control rule for an extracted object, in the object storage unit 500, wherein objects that are to be accessed are stored. In accordance with an access request granted by the access controller 200, an access processor 600 performs a process for an object that is an access control target.

The access control system in this embodiment may be constructed as a network system wherein multiple computers are connected by a network, or as a part of a single computer. In the first case, the access request unit 100 in FIG. 1 is implemented by a personal computer, a portable terminal or another type of terminal device. The functions of the access controller 200, the object manager 300, the object correlation manager 400, the object storage unit 500 and the access processor 600 are provided by a server machine connected, via a network, to the terminal device that is the access request unit 100.

In the second case, the function of the access request unit 100 is implemented by an application program, which is executed by a computer, for accessing and processing an object stored in the object storage unit 500. The functions of the access controller 200, the object manager 300, the object correlation manager 400, the object storage unit 500 and the access processor 600 are implemented by an operating system or an application program.

The elements in FIG. 1 are virtual software blocks, the functions of which are implemented by a CPU under the control of a computer program, such as an application program or an operating system. The computer program for controlling the CPU is stored on a storage medium, such as a CD-ROM or a floppy disk, or is transmitted via a network.

The objects stored in the object storage unit 500 are tagged objects and un-tagged objects.

The tagged objects include tagged objects comprising general data, such as documents, and access control tagged objects that represent access control rules corresponding to the tagged objects. The access control objects include not only the tagged objects, but also the access control rules that correspond to other access control tagged objects.

A tagged object is an object having an arbitrary form that does not include a tag expression.

Figure 2:
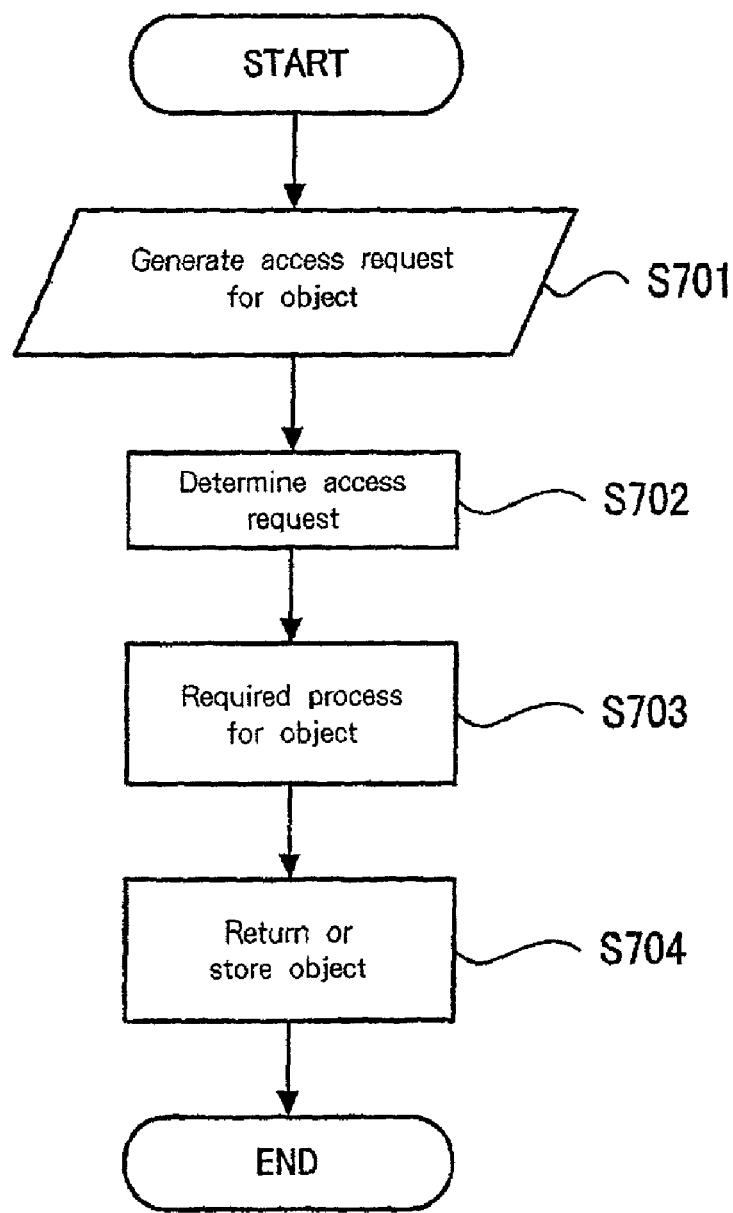
FIG. 2 is a diagram showing an overview of an operating algorithm according to the embodiment.

FIG. 2 is a flowchart showing an overview of the algorithm for the operation performed by the access control system in FIG. 1.

First, the access request unit 100 generates an access request for an object (step 701), and then the access request generated by the access request unit 100 at step 701 is transmitted to the access controller 200.

Upon the receipt of the access request, the access controller 200 extracts a target object from the object storage unit 500 via the object manager 300 (in this case, since three objects, an access control tagged object, a tagged object or an un-tagged object can be employed as a target object, collectively, the objects are simply referred to as an object).

In addition to the target object, the object manager 300 extracts, from the object storage unit 500, an access control tagged object that represents an access control rule for the pertinent object, and transits the access control tagged object to the access controller 200. At this time, if required, the process is shifted to the object correlation manager 400, which performs the supplemental process for the extracted object.

Upon the receipt of the target object and the access control tagged object, the access controller 200 determines whether the accessing of the object should be permitted (step 702). When the accessing is permitted, at step 702, the access processor 600 performs a process corresponding to the access request for the target object (step 703). In accordance with the contents of the process, the access controller 200 determines a return destination for the object obtained at step 703, and transmits the object to the access request unit 100 or to the object storage unit 500 (step 704). When, for example, the reading of data is requested, the target object must be returned to the access request unit 100. While when, as the process corresponding to the access request, the rewriting of data is performed, the rewritten object must be stored in the object storage unit 500.

As is described above, the same main processing is performed by the access control system in FIG. 1, regardless of whether the access target is an access control tagged object, which is an access control rule, or a tagged object or an un-tagged object, which is a common data object.

FIG. 3 is a diagram for explaining the data structure of an access target object in this embodiment. The objects in FIG. 3 are those that are to be stored in the object storage unit 500, and as is described above, include both tagged objects and un-tagged objects. The tagged objects are sorted into tagged objects, either general data objects or access control tagged objects, in accordance with a defining rule concerning access control contents. The data structure of a tagged object is specified by a tag, as is shown in FIG. 3.

While referring to FIG. 3, the tags added to the objects are an access control identification name tag, an access enabled subject tag and an arbitrary tag.

The access control identification name tag is a tag for designating a user name, a group name or a system processing number, all of which are access subjects that are generated a tag object. The access enabled subject indicated by the tag includes an access right for all the processes available for the tag object.

For the tag object, an arbitrary tag representing the data structure can be set in accordance with the data form of the tag object.

Multiple access control identification name tags and multiple access enabled subject tags can be set for one tagged object.

The tags provided for the access control tagged objects are an access control identification name tag, an access enabled subject tag, an access target tag, an access subject tag, an access type tag, an access flag tag and an access condition tag. The same tags as are described for the tagged object are applied for the access control identification name tag and the access enabled subject tag.

The access target tag represents an object (hereinafter referred to as a target object) that is to be accessed using the access control tagged object. The contents of the access target tag is the name of a tag added to the target object. When the parental relationship is represented by using multiple objects, the object to be accessed can be determined by using the tag name.

The access subject tag represents the subject permitted to access the target object by the access control tagged object. The access subject tag is an identifier for designating a user, a group or a process for accessing the target object.

The access type tag represents the type of process performed for the target object. Example processes are reading, altering, adding, generating and deleting.

The access flag tag is a flag for determining whether an access should be permitted, and the contents of this tag represents either approval or disapproval. That is, when the access subject represented by the access subject tag requests the process written in the access type tag for the target object in the access target tag, and when the access flag tag indicates approval, access is permitted by the access control tagged object. While when the access flag tag indicates disapproval, access is denied by the access control tagged object.

The access condition tag represents a condition for applying the access control tagged object, and is written as a specific condition expression that can evaluated.

Among the tags constituting the access control tagged objects, a set consisting of the access target tag, the access subject tag, the access type tag, the access flag tag and the access condition tag represents one access control rule. Therefore, when multiple sets are designated, multiple like types of access control rules can be set for the access control tagged object. For each set, Null may be set for the contents of a tag, such as the access condition tag, so that access control is not especially affected even when a tag is not set. Further, these tag types are merely examples, and so long as the access control is not deteriorated, any of these tags may be eliminated, or other tags may be added for information that can be used for access control.

As is described above, according to this embodiment, since the access control rules are written as tagged objects, the data structure of which is specified by the tag, the access control rule can be treated in the same manner as is the tagged object.

An un-tagged object has an arbitrary form, and does not have an internal data structure represented by a tag. For example, a GIF file is an-tagged object.

FIG. 4 is a diagram showing a list of information sets (interfaces) that are exchanged by the blocks of the access control system in FIG. 1.

In FIG. 4, an access request is transmitted by the access request unit 100 to the access controller 200. The access request consists of a set of three types of data: an access target, an access subject and an access type, and written in it, for example, is the name of the above described tag.

The access flag information that represents the determination results obtained by the access control and the object processed by the access processor 600 are transmitted by the access controller 200 to the access request unit 100. An object identifier that represents the access target is transmitted by the access controller 200 to the object manager 300. The object identifier is information to uniquely refer to the object, and for example, can be expressed as an object ID or XPath.

The object processed by the access processor 600 is transmitted by the access controller 200 to the object storage unit 500.

A target object and an access control tagged object are transmitted by the object manager 300 to the access controller 200.

An object identifier that represents an access target is transmitted by the object manager 300 to the object storage unit 500.

A target object or an access control tagged object is transmitted by the object storage unit 500 to the object manager 300.

Object identifiers that represent a target object and an access control tagged object are transmitted by the object manager 300 to the object correlation manager 400.

An access control tagged object is transmitted by the object correlation manager 400 to the object manager 300.

A target object, an access target tag obtained from the access control tagged object, an access type tag and an access flag are transmitted by the access controller 200 to the access processor 600.

A processed object is transmitted by the access processor 600 to the access controller 200.

While referring to FIG. 1, a more detailed explanation will be given for this embodiment by using the individual components and the movements of associated objects. In the following explanation, when not otherwise specified, an object is a general term used for a tagged object and an access control tagged object.

A user issues an access request via the access request unit 100 to the access controller 200. At this time, it is assumed that an object identification name A, a subject identification name A, an access type A and an access argument A are transmitted. The object identification name A is information used for designating a target object, and serves as a pointer to the name representing a target, such as an object ID or a file name, or a specific location in a tree structure, such as the XPath. The subject identification name A is information for used designating an access subject, and represents a user name or a process name. While the access type A is information for specifying the type of a requested process, representing an operation name, such as reading or writing, and the access argument A is a parameter used for defining the operation.

Upon the receipt of the access request, using the object identification name A as an argument, the access controller 200 calls the object manager 300 in order to obtain the access information for the object identification name A.

The object manager 300 examines the object storage unit 500 to determine whether an object A is stored that matches the object ID or the file name of the object identification name A. When the object A, which is either a tagged object, an access control tagged object or an un-tagged object, is found, it is extracted from the object storage unit 500. When, however, an object that corresponds to the object identification name A is not found in the object storage unit 500, an error message is output and the processing is terminated.

When the access control identification name tag is included in the object A, the object manager 300 regards the data in the tag as an object identification name B, and extracts, again from the object storage unit 500, an object B, which is pertinent to the object identification name B, that it uses as an access control rule for the object A. When there are multiple object control identification tags, multiple objects B should be obtained.

Further, if the object A includes a tag name "access enabled subject", it is assumed that only an access enabled subject can access the object A, so that no further processing is performed.

Thereafter, the object manager 300 returns the thus obtained objects A and B to the access controller 200.

The access controller 200 determines the access permission based on the access control rule, relative to the object A, that is written in the object B. Based on the obtained access determination results, the access controller 200 requests a required process for the access processor 600.

As is shown in FIG. 4, the access processor 600 receives, from the access controller 200, a target object, an access target tag, an access type tag and an access flag tag that represents the access determination results, and based on these received data, executes the process for the target object. Then, based on the process results, the access processor 600 generates a result object R that it transmits to the access controller 200.

The access controller 200 transmits the result object R, obtained by the access processor 600, to the access request unit 100 or the access storage unit 500. When, for example, reading of the target object is requested as a process (access type tag), the result object R (the same as the target object) is returned to the access request unit 100. Thereafter, when the data rewriting has been performed by the access processor 600, the generated result object R is transmitted and stored in the access processor 600. Depending on the contents of the process, the result object R may be transmitted to both the access request unit 100 and the access storage unit 500, or no process may be performed. For this determination, a correlation table in FIG. 8 may be included in the access controller 200, and how to handle the object R may be determined in accordance with the access type that constitutes the argument for the access request or the access type tag for the access control tagged object.

An explanation will now be given for a case wherein an object A, extracted from the object storage unit 500, is an un-tagged object. Since an un-tagged object does not have a tag, an access control tagged object representing the access control rule can not be designated. Thus, a supplemental process is performed by the object correlation manager 400. In this case, the object manager 300 inquires, of the object correlation manager 400, whether there is an entry designating the access control for the object identification name A. When there is an access control tagged object that corresponds to the entry in the inquiry submitted by the object manager 300, the object correlation manager 400 transmits the identification name for the pertinent object to the object manager 300. In this case, assume the object identification name B is transmitted; but when there is no access control tagged object that corresponds to the entry in the inquiry submitted by the object manager 300, an empty access control tagged object that has no description is transmitted. The object correlation manager 400 manages entries, such as the deletion of an entry, based on the effective period of the entry and the usage flag.

The correlation between an un-tagged object and an access control tagged object stored in the object correlation manager 400 will be described in detail later.

A detailed explanation will now be given for the processing performed by the access controller 200 to determine access control. An access target, an access subject, an access type, an access flag and an access permission condition are written in an access control tagged object received from the object manager 300.

Figure 5:
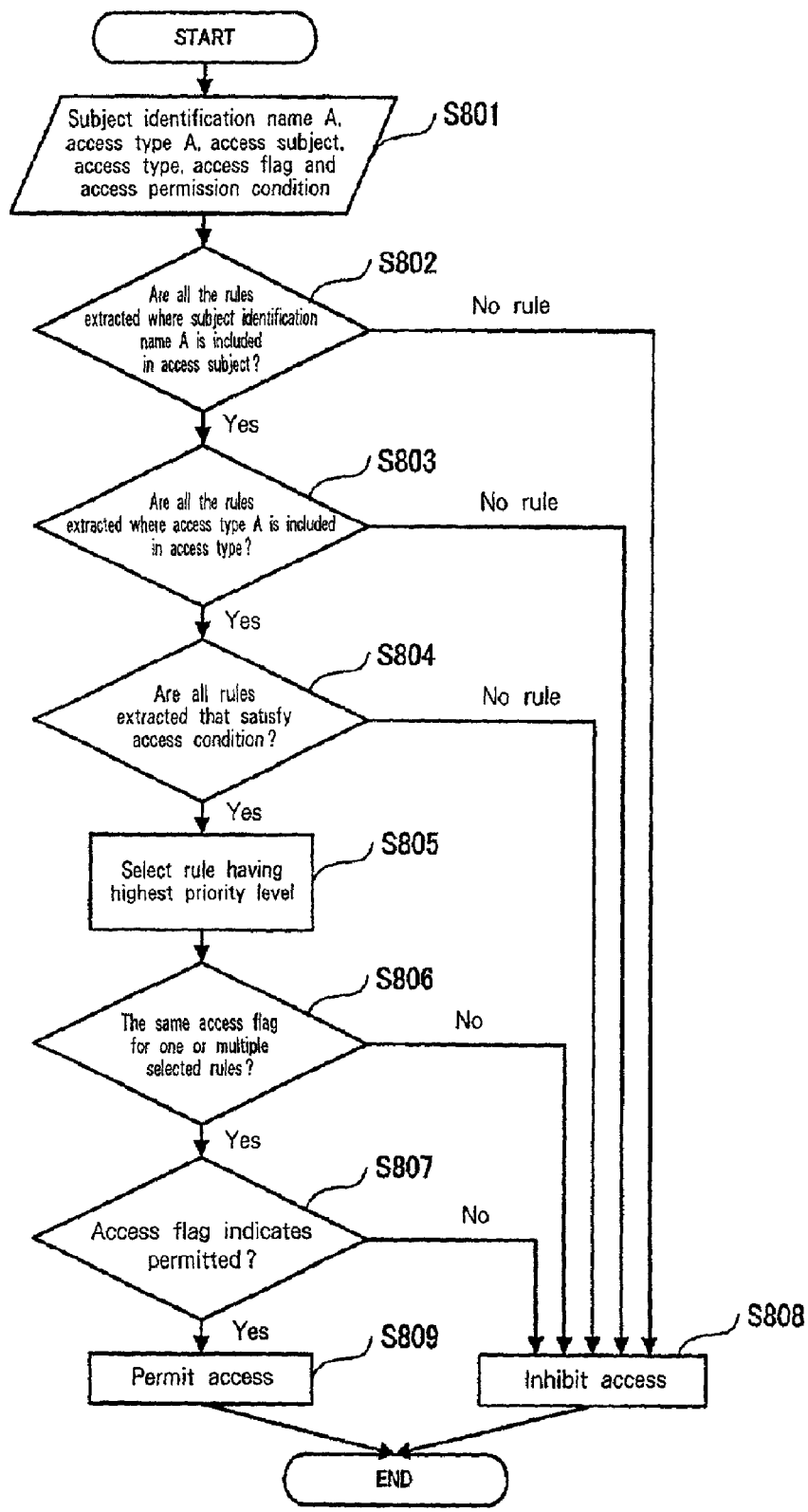
FIG. 5 is a flowchart showing an access determination algorithm for an access request according to the embodiment.

FIG. 5 is a flowchart showing the access determination algorithm relative to an access request received from the access request unit 100.

In FIG. 5, first, a subject identification name A, an access type A, an access subject, an access type, access flags and an access permission condition, which are obtained in accordance with the access request, are transmitted by the object manager 300 (step 801). Then, all the rules are extracted for including the subject identification name A in the access subject (step 802). When there are no such rules, access is denied (step 808); but when there are, in the succeeding process, all the rules for including the access type A in the access type are extracted from the previously extracted rules (step 803). When there are no such rules, access is denied (step 808); but when there are, in the succeeding process all the rules that satisfy the access permission condition are extracted (step 804). If there are no such rules, access is denied (step 808); but if there are, in the succeeding process the rule having the highest priority is selected from the extracted rules (step 805). While one or multiple rules are selected, a check is then performed to determine whether all the access flags correspond (step 806). When the access flags do not correspond, access is denied (step 808); but when they do, in the succeeding process, a check is performed to determine whether the access flags for the selected rules indicate approval (step 807). When the access flags indicate disapproval, access is denied (step 808); but when, at step 807, the access flags indicate approval, access is permitted (step 809).

An explanation will now be given for the processing performed by the object manager 300 and the object correlation manager 400 to exercise access control for an un-tagged object.

When the identifier of an un-tagged object is included in the tagged objects transmitted to the object manager 300, the object manager 300 transmits a request to the object correlation manager 400 for the generation of a new entry. This process is performed when a tagged object, such as an HTML file, is accessed and when immediately following this an access of an un-tagged object, such as a gif file or a Word file, occurs. In this embodiment, according to the access control rule for an un-tagged object, it is assumed that access control is exercised through a tagged object to which an un-tagged object points. Therefore, an access control rule that corresponds to the un-tagged object and that is included in the tagged object is transmitted to the object correlation manager 400, and a correlation table is temporarily prepared. Based on this table, immediately after the tagged object, such as an HTML file, is read, flexible control of the access for reading the un-tagged object, such as a gif file, is provided.

An explanation will now be given for the object correlation management processing performed by the object correlation manager 400. The object correlation manager 400 manages an object correlation table for temporarily storing a relationship existing between an un-tagged object and an access control rule.

FIG. 6 is a diagram showing the structure of the object correlation table.

In FIG. 6, in the object correlation table, the data entries, i.e., the object identifier, the access subject, the access type, the access control tagged object identifier, the effective period and the history are correlated with the definitions for the interfaces. The object identifier is the identifier for an un-tagged object, and is, for example, a gif file (.gif). The access control tagged object is an access control rule for the object identifier, and represents a rule that has been employed. In addition to these data entries, flags indicating the effective period and the usage history for each entry are set, and information concerning the effective period and the usage history of the entry is employed to delete an entry for an effective period which has expired. This is the manner in which the object correlation table is managed.

The access processor 600 executes, for the object, a required process defined in accordance with the access type. The required process is provided by a script program stored in the access processor 600, and other, default programs. The script program employs, as arguments, an object, an access type and an access argument, and includes a function for returning, as a processed object, processing results obtained as requested. The default programs are a program for setting the values of an access enabled subject tag and an access control identification tag before the generation of a new object, and a program for generating a blank null object before deleting the object. The first default program sets, in the access enabled subject tag, the identification name of an access subject that issues an access request, and sets an access control tagged object identifier in the access control identification tag.

When the tagged object is transmitted by the object manager 300 to the access controller 200, multiple access control rules may be written in the received access control tagged object. Or, multiple access control tagged objects may be transmitted by the object manager 300, and in this case, a contradiction may occur among the access control rules. For example, when "Alice can read the contents of a Date tag" is written as the first rule, and "Alice can not read the contents of a Date tag" is written as the second rule, the contradiction occurs. Thus, the algorithm for this embodiment employs a contradiction resolving method based on the priority order of the rules. According to this method, priority levels are set for the rules, and the access control rule having the highest priority is always applied. In this case, when different priority levels are assigned for all the rules, results without a contradiction are always obtained.

Figure 9:
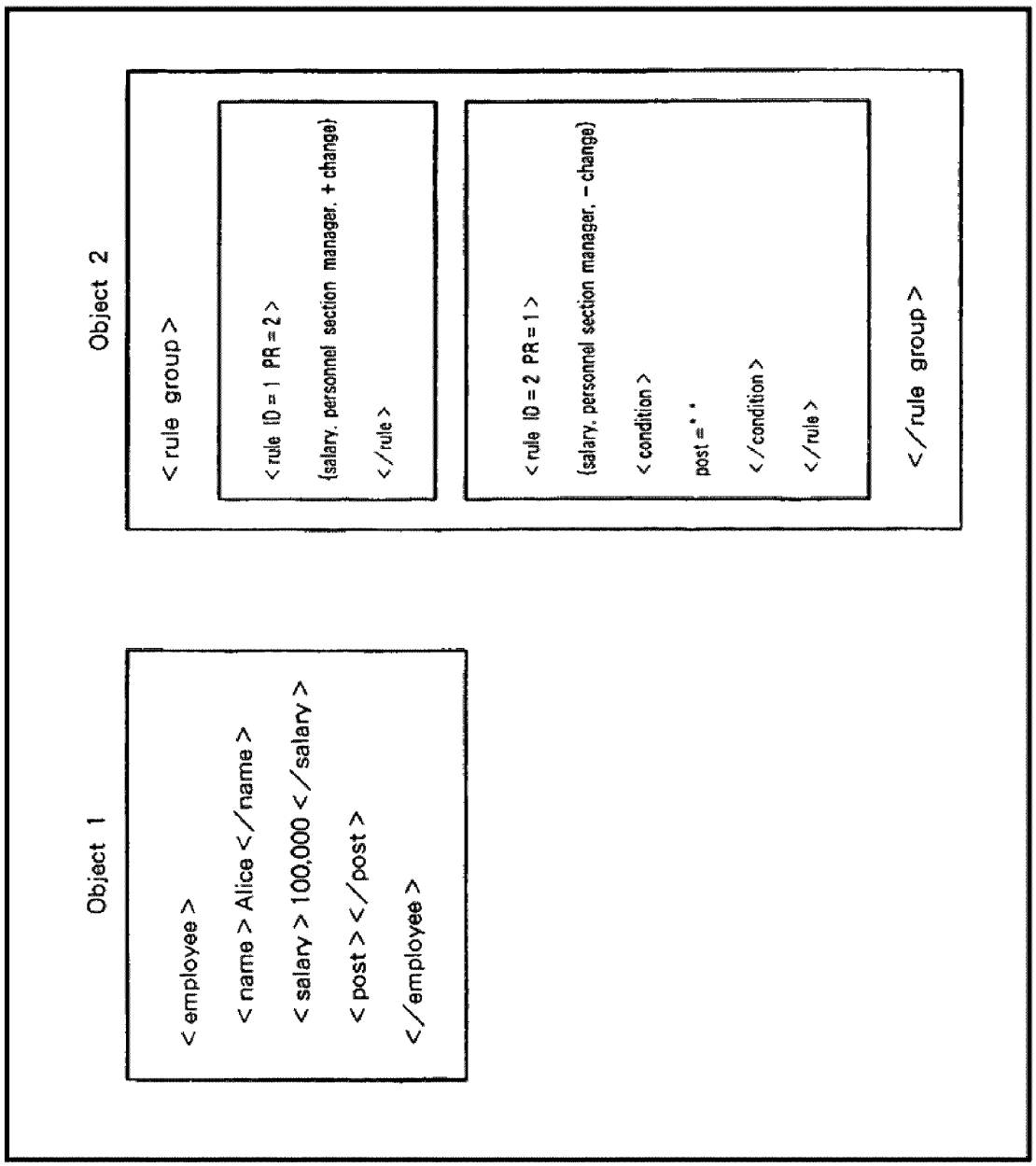
FIG. 9 is a diagram showing an example tagged object and an access control tagged object according to the embodiment.

FIG. 9 is a diagram showing a set of access control rules for employee data. The rule ID=1 indicates that "the personnel section manager can change the employee's salary field", and the rule ID=2 indicates that "when an employee does not hold a post, the personnel section manager can not change the employee's salary field". In this case, the results, such as "changeable", based on the rule ID=1, and "unchangeable", based on the rule ID=2, that contradict each other may be output concerning the changing right. In this embodiment, this contradiction is resolved based on the priority levels provided for the rules. As is shown in FIG. 9, as an attribute, a priority level of 2 (PR=2) is set for rule 1, and a priority level of 1 (PR=1) is set for rule 2. That is, since the priority level of a rule that outputs an "unchangeable" result is higher than that of rule that outputs a "changeable" result, the "unchangeable" result can be obtained. Thus, even when a contradiction concerning the changing right occurs, a rule can be determined in accordance with the priority level.

By using a specific example, a more detailed explanation will now be given for an access control for a process for changing a tagged object that is already present. The changing operation for the data in an object is represented by the access type, such as changing or addition. Changing means the tag structure of the tagged object has been altered, and addition means that a child tag structure has newly been added to the tagged object.

Figure 10:
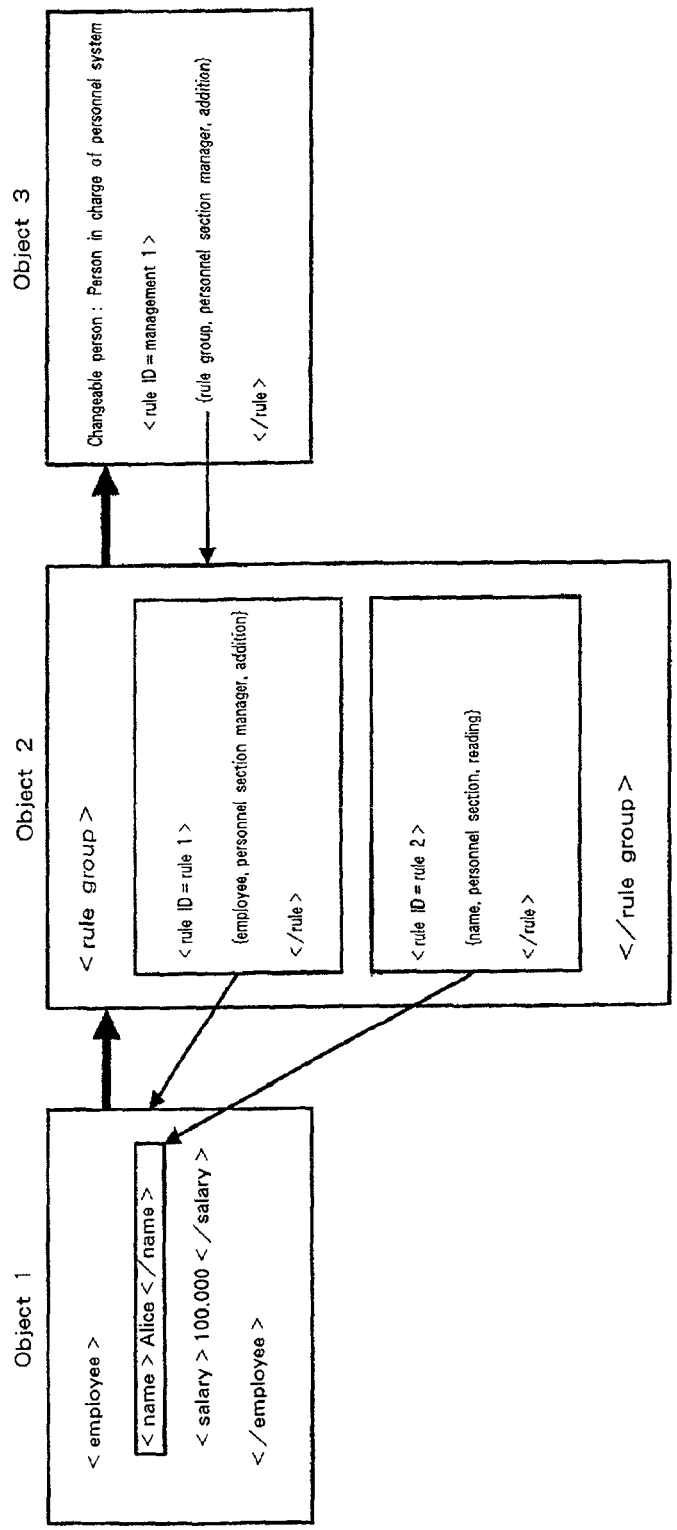
FIG. 10 is a diagram showing the initial data state used to explain the access control operation according to the embodiment.

FIG. 10 is a diagram showing the initial states of the data and the access control rule. In FIG. 10, object 1, object 2 and object 3, provided for the tagged objects, are object identification names.

The object whose identification name is object 1 is a tagged object that includes information concerning the salary of Alice, who is one of employees. The object whose identification name is object 2 is an access control tagged object that represents an access control rule group for the tagged object. The object whose identification name is object 3 is an access control tagged object that represents an access control rule for the access control tagged object. A change permitted person who corresponds to an access enabled subject is designated in object 3.

Further, in FIG. 10, thick arrows indicate the values of the access control identification name tags, and designate objects that represent access control rules for other objects. Thin arrows represent an available range for the access control.

Figure 11:
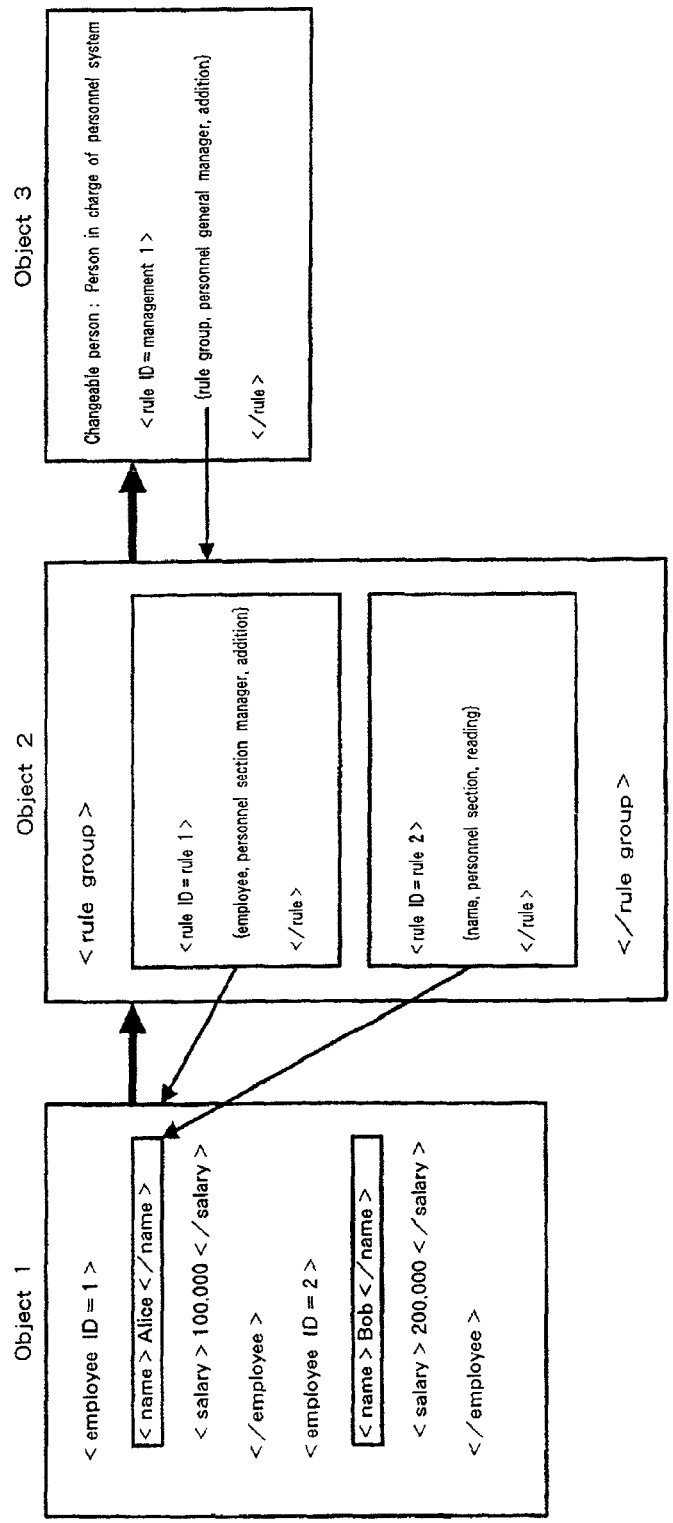
FIG. 11 is a diagram showing the state wherein data is added to a tagged object in an object group having the relationship in FIG. 10.

The operation for exercising access control for a tagged object will now be described. FIG. 11 is a diagram for explaining the state wherein data is added to a tagged object in objects that are correlated as shown in FIG. 10. In the example in FIG. 11, assume that the access request unit 100 issued an access request that includes "object 1" as the object identification name A, "personnel section manager" as the subject identification name A, "addition" as the access type A, and "<employee><name>Bob</name><salary>200,000</salary></employee>"as an access argument A. The access controller 200 extracts object 1, which is the object identification name A, from the received access request, and transmits object 1 to the object manager 300.

The object manager 300 then extracts object 1, which corresponds to the object identification name A, from the object storage unit 500. The object manager 300 then extracts, from the tagged object, which is object 1, the identification name of the access control tagged object that is represented by the access control identification name tag of the tagged object. The access control tagged object, which is designated by the extracted identification name, defines a set of access control rules for the tagged object that is object 1. In this embodiment, access control rule object 2 is indicated by a thick arrow. The object manager 300 extracts object 2 from the object storage unit 500, and the access controller 200 receives object 1, which represents data, and object 2, which represents a set of access control rules, and transmits objects 1 and 2, with the access argument A received from the access request unit 100, to the access processor 600.

The access processor 600 determines whether object 2 permits the personnel section manager to add the access argument A to object 1. Then, it is ascertained that the rule 1, which is the rule that represents the personnel section manager, can add data to the employee data, and the addition process is performed.

As a result, in accordance with the access request received from the access request unit 100, the employee entry for Bob, which is the access argument A, is added to object 1, the employee data. Updated object 1 is then transmitted as object R to the access controller 200.

In accordance with the access type, the access controller 200 determines whether object R, i.e., updated object 1, is to be returned either to the access request unit 100, or to the object manager 300. The transmission destination of object R is determined by referring to the correlation table in FIG. 8, and is based on the contents of the process performed by the access processor 600. In this embodiment, assume that a rule exists according to which, when the access type is addition, object R should be transmitted to the object manager 300, and that object R, which is object 1 to which the employee entry has been added, is transmitted to the object manager 300. Thereafter, the object manager 300 transmits object R, received from the access controller 200, to the object storage unit 500, and the object storage unit 500 stores object R.

Finally, the access controller 200 transmits the access determination results to the access request unit 100, and terminates the processing for the access request.

Figure 12:
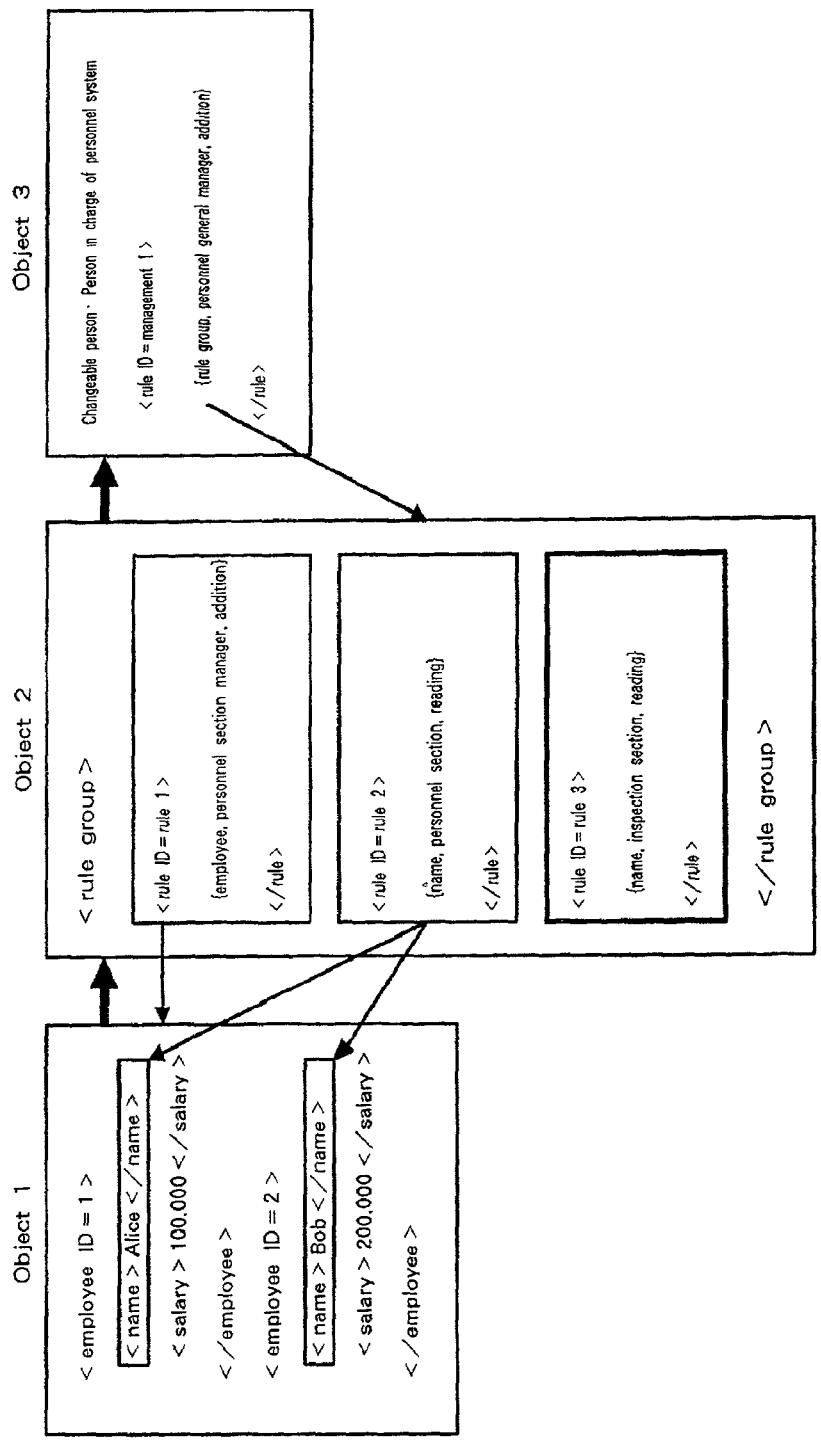
FIG. 12 is a diagram showing the state wherein an access control rule is added to an access control tagged object in an object group having the relationship in FIG. 11.

An explanation will now be given for the access control processing for access control rules. FIG. 12 is a diagram for explaining the state wherein an access control rule is added to an access control tagged object in the object group in FIG. 11.

In the example in FIG. 12, the access request unit 100 has issued an access request that includes "object 2" as the object identification name A, "personnel general manager" as the subject identification name A, "addition" as the access type A, and "<rule>[name, inspection section, reading]</rule>" as the access argument A. In [name, inspection section, reading], "name" represents an access target tag, "inspection section" represents an access subject tag, and "reading" represents an access type tag. Further, assume that "permitted" is designated for the access flag tag, and "true" is designated for the access condition tag. The access controller 200 extracts object 2, which is the object identification name A, from the received access request, and transmits object 2 to the object manager 300.

The object manager 300 then extracts object 2, which corresponds to the object identification name A, from the object storage unit 500, and from the access control tagged objects, which are extracted as objects 2, extracts the identification name of the access control tagged object, which is represented by the access control identification tag. The access control tagged object, which is designated by the extracted identification name, defines a set of access control rules for the access control tagged object, which is the object 2. In this case, object 3, which is indicated by a thick arrow, is the access control rule. The object manager 300 extracts object 3 from the object storage unit 500, while the access controller 200 receives object 2, which represents a set of access control rules, and object 3, which represents an access control rule for that access control rule, and transmits objects 2 and 3, with the access argument A received from the access request unit 100, to the access processor 600.

The access processor 600 determines whether object 3 permits the personnel general manager to add the access argument A to object 2. Then, it is ascertained that management 1 is a rule representing a new access control rule that can be added to a set of access control rules for object 2, and the addition process is performed.

Therefore, the entry for rule 3 is added as the access argument A to object 2, as requested by the access request unit 100. While the updated object 2 is transmitted as object R to the access controller 200.

In accordance with the access type, the access controller 200 determines whether object R, which is the updated object 2, is to be transmitted either to the access request unit 100 or to the object manager 300. As is described above, it is assumed that a rule exists whereby, when addition is the access type, object R should be transmitted to the object manager 300, and object R, which is object 2 to which the entry rule 3 has been added, is transmitted to the object manager 300. The object manager 300 transmits object R, received from the access controller 200, to the object storage unit 500, and the object storage unit 500 stores object R.

Finally, the access controller 200 transmits the access determination results to the access request unit 100, and terminates the processing for the access request.

Through the above processing, both the access control process for the data, and the access control rule for the access control rule can be processed in the same manner.

It should be noted that the access enabled subject is written in an access control tagged object that exists at levels higher than all the tag objects. That is, in the access control system of this embodiment, a user having the right of access for all the objects is set. In this case, since the access control rules can be multiplexed and flexibly set as described above, when only one part of the access rights to a specific access control rule is to be provided for a specific user, such an access control rule need only be set as the access control tagged object, and the user for whom the right is to be provided need not be added to the access enabled subject.

In the examples in FIGS. 10 to 12, object 3 is written as the topmost access control tagged object, and the person in charge of the personnel system is written in as an access enabled subject (as a changeable person in FIGS. 10 to 12).

The generation and deletion of a tagged object will now be described by employing a specific example. The generation of a tagged object is represented by the access type of generation, and the deletion process is represented by the access type of deletion.

Figure 13:
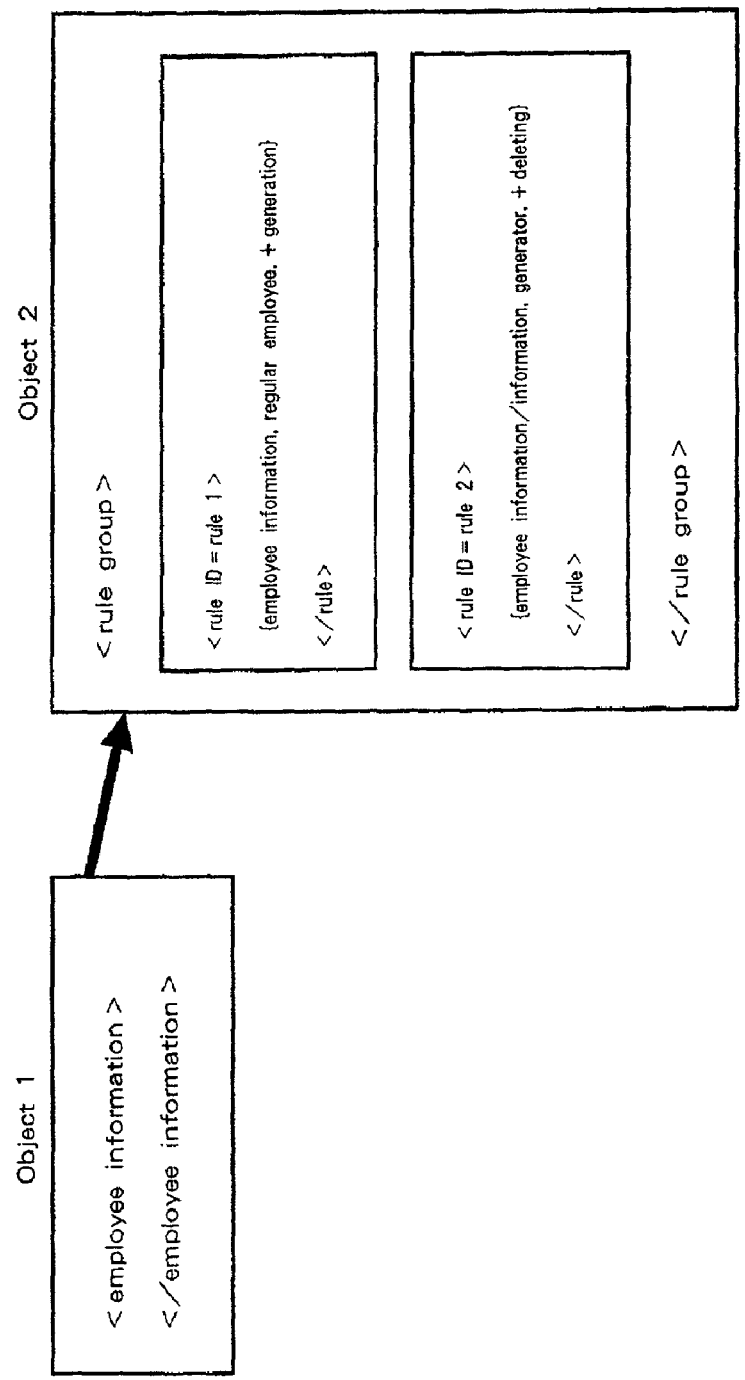
FIG. 13 is a diagram showing the initial data state used to explain the operations for the generation and the deletion of tagged objects performed by access control operations according to the embodiment.

The initial state is shown in FIG. 13. In FIG. 13, objects 1 and 2 represent the object identification names. Object 1 is a tagged object indicating employee information, and object 2 is an access control tagged object for controlling the access to object 1. Object 2 represents a rule to the effect that if the access subject is a "regular employee" group, a new tag can be generated below the employee information tag, and a rule to the effect that the generation of object 2 can delete the elements written in the employee information tag. Deletion means either the deletion of a tag, or the deletion of all the elements of an object, including the tag.

Figure 14:
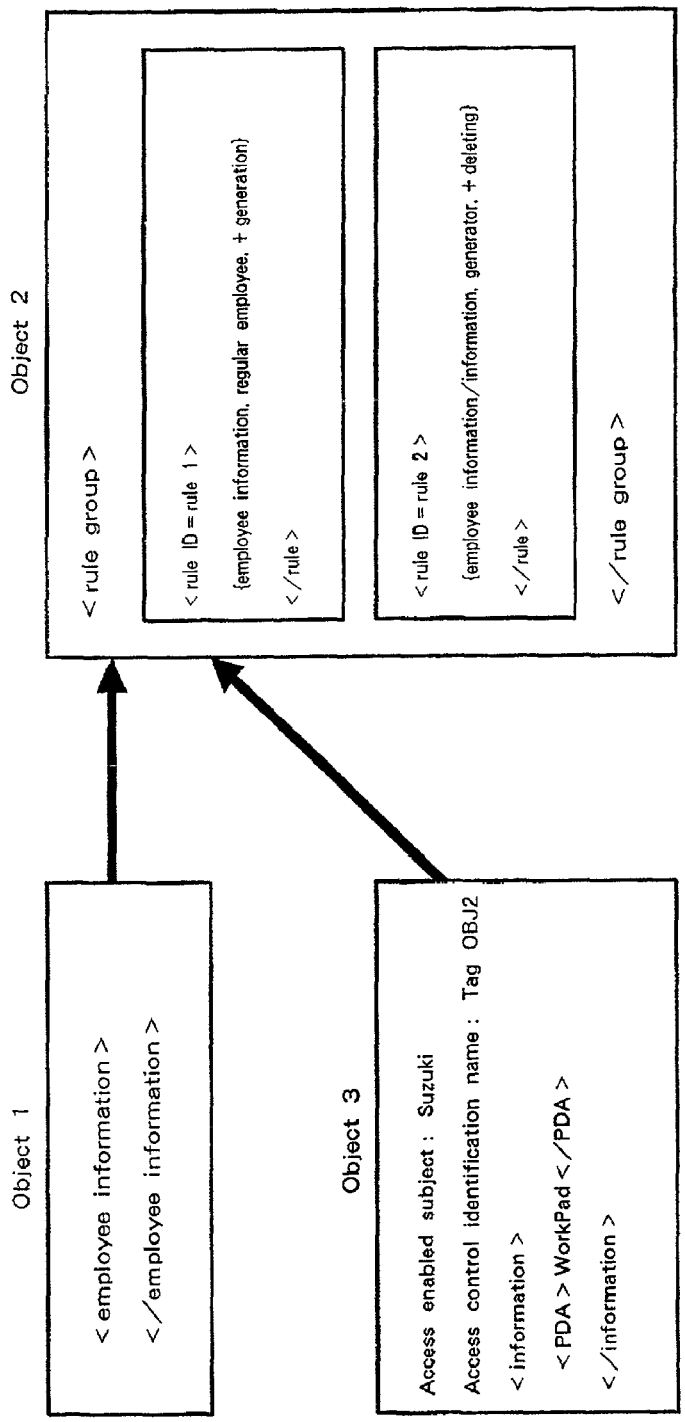
FIG. 14 is a diagram for explaining the state wherein a new tagged object is generated in the state in FIG. 13.

First, a detailed explanation will be given for an access control request for the generation of a tagged object. FIG. 14 is a diagram for explaining the state wherein a new tagged object (object 3 is the object identification name) is generated from the state in FIG. 13.

Assume that the access request unit 100 has issued an access request in which is included "object 1", as the object identification name A, "Suzuki", as a subject identification name that is included in a regular employee group, "generation", as the access type A, and "<information><PDA>WorkPad</PDA></information>", as the access argument A. Upon receipt of the access request, the access controller 200 extracts from the access request "object 1", which is the object identification name A, and transmits object 1 to the object manager 300.

The object manager 300 extracts object 1 from the object storage unit 500, and then, since the access control identification name tag of object 1 points to object 2, the object manager 300 extracts object 2, which corresponds to the object identification name A, from the object storage unit 500. Thereafter, extracted objects 1 and 2 are transmitted to the access controller 200.

The access controller 200 receives objects 1 and 2 from the object manager 300, and executes the access determination algorithm in FIG. 5 and finds that the access is permitted. Therefore, the access controller 200 transmits objects 1 and 2, along with the access argument A received from the access request unit 100, to the access processor 600.

Assume that a process script program shown in FIG. 15 is provided for the access processor 600. A new object 3 is generated by a tagged object generation program in FIG. 15 and a default program, and is transmitted as a processed object to the access controller 200.

Object 3 includes, as the value of an access control identification tag, object 2, which is a set of access control rules for generating object 3. As the interpretation of the access enabled subject, it can be assumed that the succeeding access control rule (access control tagged object) is present, and has a priority level lower than the object designated by the access control identification tag.

<rule>
[*, access enabled subject name, *]
</rule>

When the access control identification value is not set to the object, in the initial state the access control tagged object holds all the access rights.

In addition, as is shown in FIG. 16, when the access type is generation, the object storage unit 500 is set as the transmission destination for a processed object. Therefore, the access controller 200 transmits object 3 to the object manager 300, while the object manager 300 transmits object 3, received from the access controller 200, to the object storage unit 500, and the object storage unit 500 stores object 3 as the object positioned below the employee information tag of object 1.

Next, an explanation will be given for a case wherein an access control request for the deletion of a tagged object is issued. In FIG. 14, assume that the access request unit 100 has issued an access request that includes "object 3", as the object identification name A, "Suzuki", as the subject identification name A, and "deletion", as the access type A. The access controller 200 extracts "object 3", as the object identification name A, from the access request, and transmits object 3 to the object manager 300.

Subsequently, the object manager 300 extracts object 3 from the object storage unit 500, and then, since the access control identification name tag of the object 3 points to object 2, the object manager 300 also extracts object 2 from the object storage unit 500.

The access controller 200 receives objects 2 and 3 from the object manager 300, executes the access determination algorithm in FIG. 5 and finds that access is permitted, and then transmits objects 2 and 3, along with the access arguments received from the access request unit 100, to the access processor 600.

Figure 18:
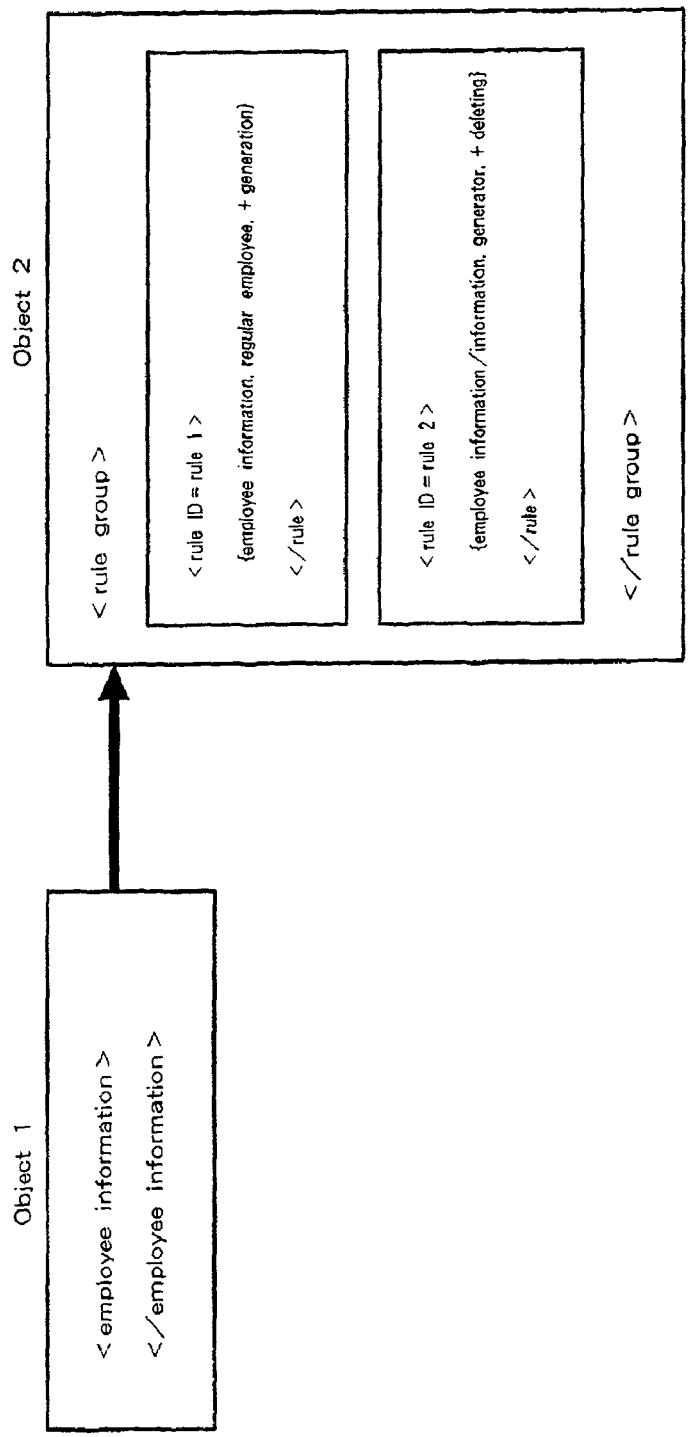
FIG. 18 is a diagram for explaining the state wherein the tagged object is deleted from the state in FIG. 14.

The access processor 600 generates an empty object (Null object) as a processed object, and as is shown in FIG. 17, when the access type is deletion, it is assumed that the object storage unit 500 is set as the transmission destination for the processed object. Therefore, the access processor 200 transmits processed, tagged object R (i.e., the Null object) to the object storage unit 500. In the object storage unit 500, object 3, which corresponds to the Null object, is overwritten, and as a result, object 3 is deleted from the object storage unit 500. The state wherein object 3 has been deleted is shown in FIG. 18.

As the application for this embodiment, an explanation will be given for the operation performed for exercising access control for an XML file stored in a WEB server.

Figure 19:
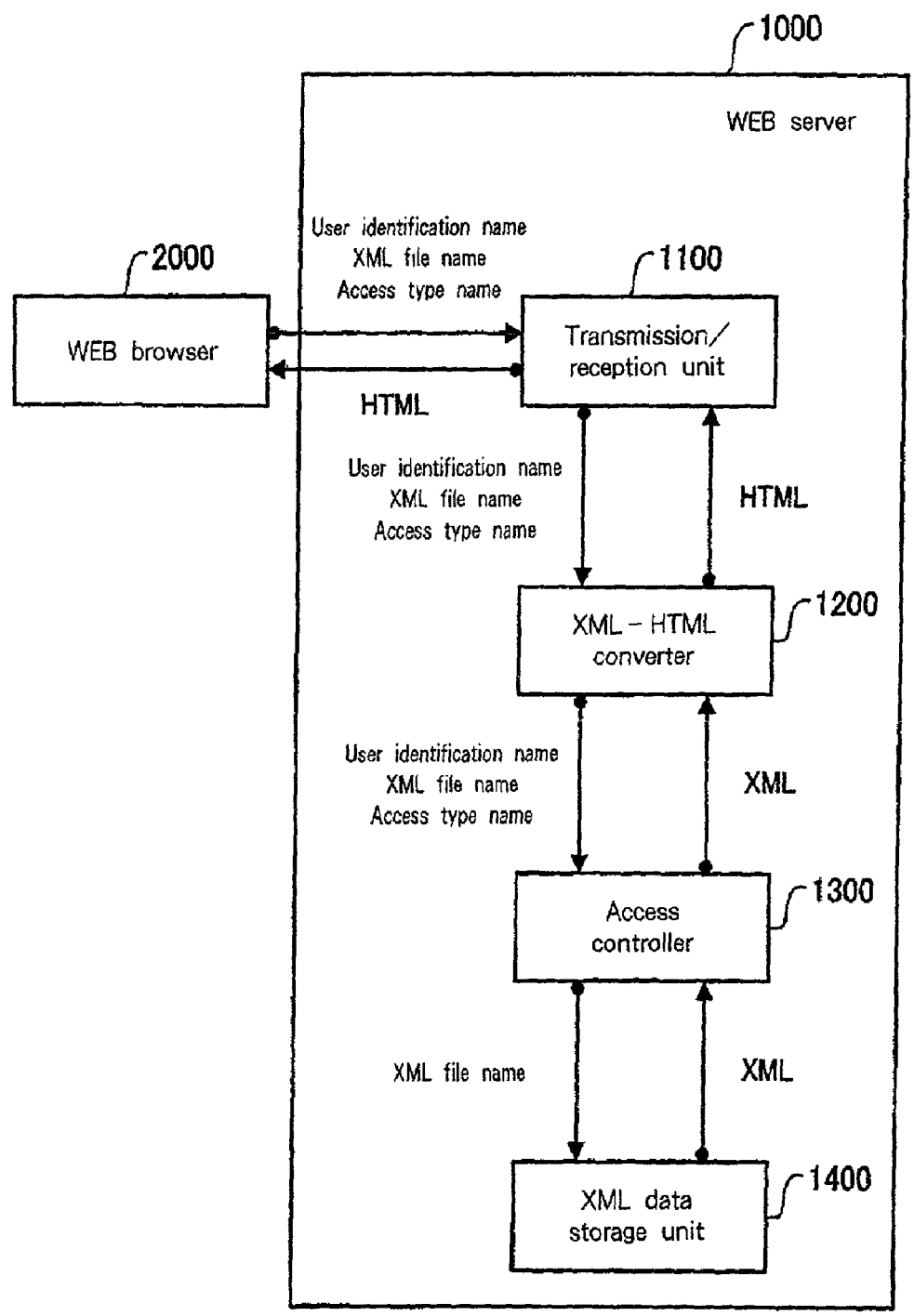
FIG. 19 is a diagram showing an example configuration for a WEB server system into which the access control system of this embodiment is introduced as an example application.

FIG. 19 is a diagram showing an example structure of a WEB server system into which the access control system of this embodiment has been introduced. The WEB server system 1000 in FIG. 19 provides the following service: an access request is accepted for multiple XML files that are stored as objects in the WEB server 1000, and access control is exercised in accordance with the access request and the results are provided as an HTML file for a WEB browser 2000 that issued the access request.

In FIG. 19, the WEB browser 2000 corresponds to the access request unit 100 in FIG. 1, i.e., issues an access request for XML data. Especially in the embodiment, the user identification name, representing the access subject, the XML file name, representing the access target, and the access type name are transmitted as the access request by the WEB browser 2000.

In the WEB server 1000, the transmission/reception unit 1100 receives an access request from the WEB browser 2000, and transmits the request to an XML-HTML converter 1200. The transmission/reception unit 1100 also receives an HTML file from the XML-HTML converter 1200, and transmits it to the WEB browser 2000.

The XML-HTML converter 1200 transmits the access request received from the transmission/reception unit 1100 to an access controller 1300, and converts an XML file it receives from the access controller 1300 into an HTML file, which it then transmits to the transmission/reception unit 1100 for retransmission to the WEB browser 2000.

The access controller 1300 corresponds to the access controller 200, the object manager 300, the object correlation manager 400 and the access processor 600 in FIG. 1. That is, based on access arguments included in the received access request, the access controller 1300 determines whether an access should be permitted, establishes the XML file name as the access target, and obtains the XML file name from an XML data storage unit 1400. Thereafter, the access controller 1300 transmits the XML file, which is obtained from the XML data storage unit 1400, to the XML-HTML converter 1200.

The XML data storage unit 1400 corresponds to the data storage unit 500 in FIG. 1, i.e., stores XML files that are objects. The stored XML files are a file that includes general data and a file that includes an access control rule.

FIG. 20 is a diagram showing an example structure for an XML file stored in the XML data storage unit 1400.

In FIG. 20, a tagged object having the object identification name X001.xml defines an employee object "the salary of an employee named Alice whose employee number is 112233 is 100,000 yen". Policy.xml is an access control rule (access control tagged object) for the employee object, and defines "a personnel section member can read an employee object". And admin.xml is an access control rule (an access control tagged object) for Policy.xml, which is the access control rule for the employee object, and defines "the personnel section manager can change access control for the employee object". As for the access control subject written in Admin.xml, what is meant by the access control tagged object Admin.xml is that a personnel system manager, which is an access enabled subject, holds an access right and can change the access control.

As is described above, the object having the object identification name Policy.xml is an access control rule for the data object having the object identification name X001.xml. And the object having the object identification name Admin.xml is an access control rule for the access control rule having the object identification name Policy.xml. There is no difference in the description forms for Policy.xml and Admin.xml.

As is described above, according to the embodiment, whether the access control rule is for a data object or for another access control rule can be determined only from the relationship existing between the objects, without distinguishing between the access control rule for the definition of the data object and the access control rule for that access control rule.

As an example, assume that under the conditions wherein these access control tagged objects are prepared, an access request "Can Takahashi, the personnel section member, read an employee file?" is issued by the WEB browser 2000. Since the access subject is the personnel section member, the access flag indicates "permitted" as the access determination result. In consequence thereof, the employee file X001.xml, which is stored as an object in the XML data storage unit 1400, is converted into an HTML file, and the HTML file is transmitted to the WEB browser 2000.

As another example, assume that an access request "Can Yamamoto, the inspection section manager, rewrite the access control for the employee file?". Since the access subject is the inspection section manager, the access flag "inhibited" is returned as the access determination result to the WEB browser 2000.

Next, assume that there is a rule that "the personnel section manager can change the access control rule for the employee object", and that a rule "the inspection section manager can change the access flag in the access control rule for the employee object" is added to the access control rule. This means that a part of the access right in the access control rule for the employee object is assigned to the inspection section manager.

FIG. 21 is a diagram showing the state wherein the XML file, which is a new access control tagged object, is added to the state in FIG. 20.

In FIG. 21, the object having the object identification name Policy.xml is an access control rule having the access control identification names Admin1.xml and Admin2.xml, and means that "the personnel section member can read the employee object". The tagged object having the object identification name Admin1.xml is an access control rule for Policy.xml, and the access enabled subject is a personnel system manager. This means that "the inspection section manager can change the access flag". A tagged object having the object identification name Admin2.xml is an access control rule for Policy.xml, and the access enabled subject is a personnel system manager. This means that "the personnel section manager can change the access control".

When the access control rule is changed, and when the access request "Can Yamamoto, the inspection section manager, rewrite the access control for the employee file?" is issued by the WEB browser 2000, the access determination "permitted" is returned to the WEB browser 2000, and the file Admin1.xml, wherein the access control is written, is converted to an HTML file and is transmitted to the WEB browser 2000.

Figure 22:
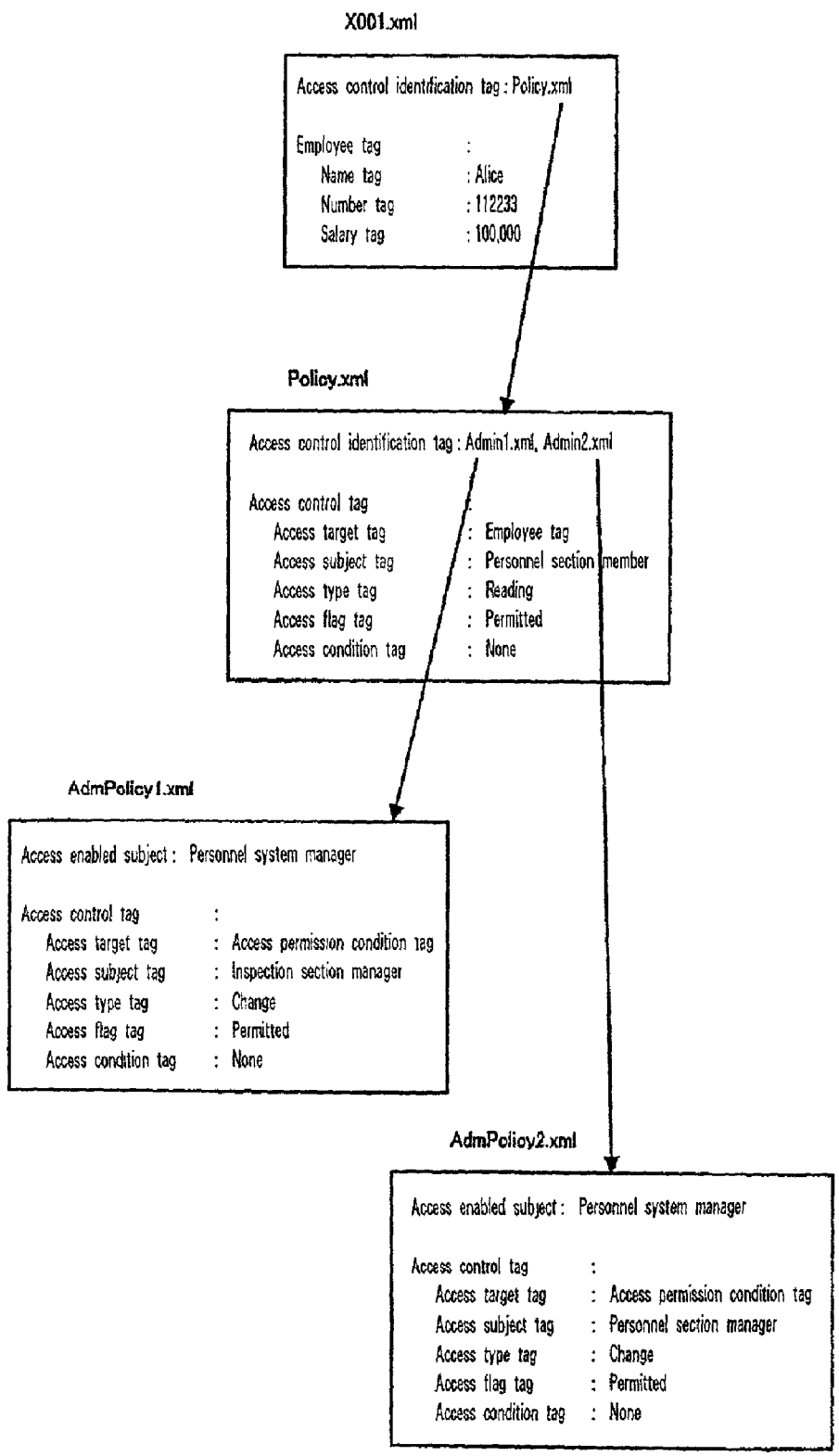
FIG. 22 is a diagram showing the relationship between the objects in FIGS. 20 and 21.

FIG. 22 is a diagram showing the relationship between the tagged objects: the employee object X001.xml, the access control rule Policy.xml for the employee object, and the access control rules AdmPolicy1.xml and AdmPolicy2.xml for the access control rule Policy.xml.

In FIG. 22, the access control rule for X001.xml is Policy.xml, and the access control rules for Policy.xml are AdmPolicy1.xml and Admpolicy2.xml.

Further, there is no difference in the description between the access control rule Policy.xml, for the data object X001.xml, and the access control rules AdmPolicy1.xml and AdmPolicy2.xml, for the access control rule Policy.xml.

As is described above, for the conventional access control, there is a simple rule, "only a system manager can change an access control rule", and this rule can not be altered. Whereas in this embodiment, the access control rule is written in the same form as the access control rule for the data object, so that the access control rule for the data object and the access control rule for the access control rule can be handled without being distinguished between. Whether the access control rule is for a data object or for another access control rule can be determined from the relationship existing between the objects.

The description of an access control rule for an access control rule can be flexibly added, changed or deleted in the same manner as can an access control rule for a data object.

As another application for the embodiment, an explanation will now be given for an operation for the exchange by WEB servers of an XML file.

Figure 23:
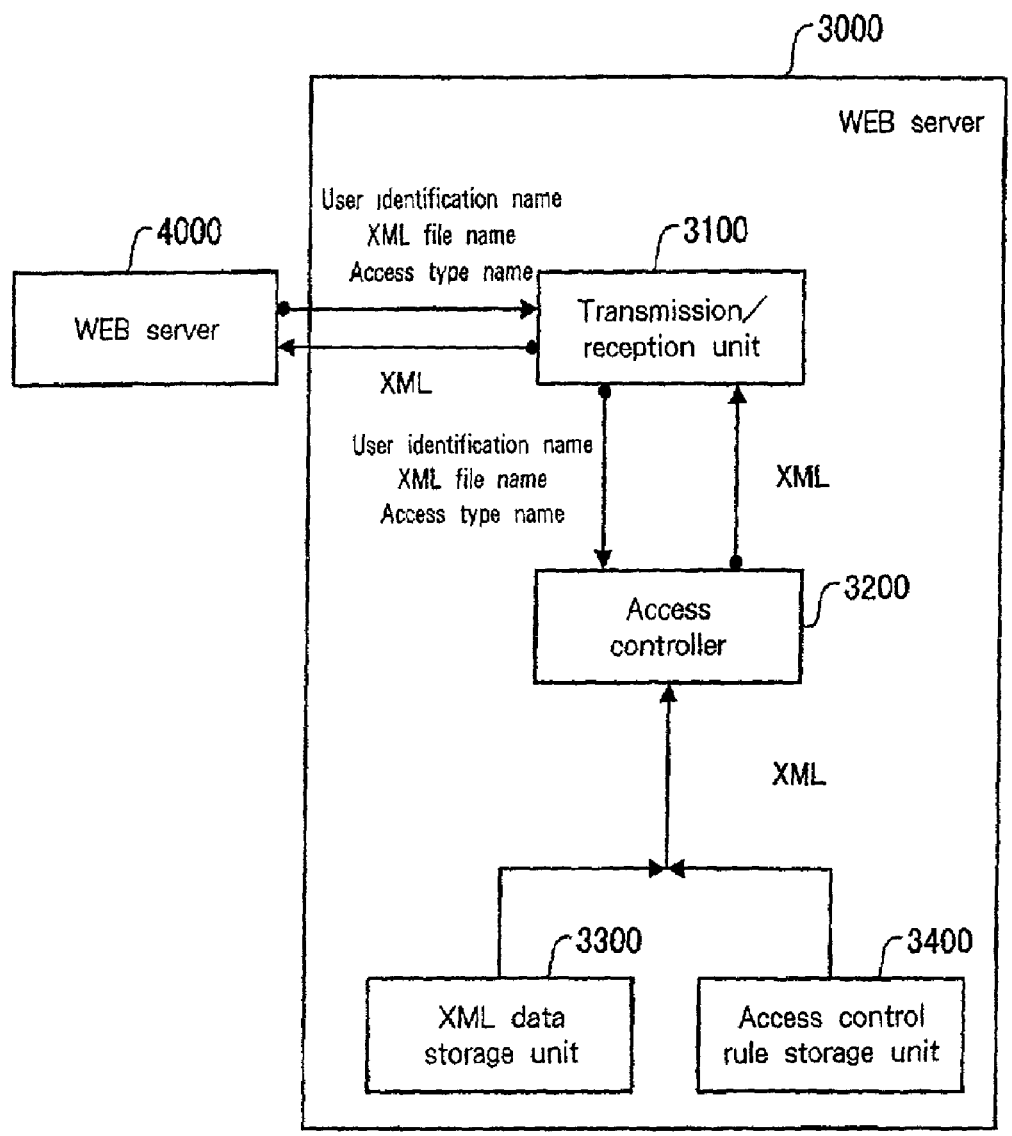
FIG. 23 is a diagram showing the relationship between a WEB server and another WEB server into which the access control system of this embodiment has been introduced as another example application.

FIG. 23 is a diagram showing the relationship between one WEB server and another WEB server into which the access control system of this embodiment is introduced. In the example in FIG. 23, the following service is provided. When an access request is issued by a WEB server 4000 to obtain an electronic order document written in XML that is stored in a WEB server 3000, access control is exercised in accordance with the access request, and the result is provided as an XML file for the WEB server 4000, which is an access request transmission source.

In FIG. 23, the WEB server 4000 corresponds to the access request unit 100 in FIG. 1. That is, the user identification name, the XML file name and the access type name are transmitted as an access request to the WEB server 3000.

In the WEB server 3000, a transmission/reception unit 3100 receives the access request from the WEB server 4000, and transmits it to an access controller 3200. Thereafter, the transmission/reception unit 3100 receives XML data from the access controller 3200, and transmits it to the WEB server 4000.

The access controller 3200 corresponds to the access controller 200, the object manager 300, the object correlation manager 400 and the access processor 600 in FIG. 1. That is, based on each access argument transmitted as an access request from the transmission/reception unit 3100, whether the access should be permitted is determined, and the XML file name, which is an access target, is established and is obtained from the XML data storage unit 3300. Subsequently, the access control rule for the XML file is obtained from an access control rule storage unit 3400, and after the access control rule has been obtained, the XML data, obtained by the access controller 3200, is transmitted via the transmission/reception unit 3100 to the WEB server 4000.

The XML data storage unit 3300 and the access control rule storage unit 3400 correspond to the object storage unit 500 in FIG. 1, i.e., stores an access target object. The XML data storage unit 3300 stores only data objects and does not store access control rules for the data objects. The access control rule storage unit 3400 stores access control rules for the data objects, which are stored in the XML data storage unit 3300, and access control rules for other access control rules, which are stored in the access control rule storage unit 3400.

Unlike the example explained while referring to FIGS. 19 to 22, the access target objects are sorted into data objects and access control rules (access control tagged objects), and these are respectively stored in the XML data storage unit 3300 and the access control rule storage unit 3400. Therefore, the access control description can be managed flexibly. For example, the access control rules are stored only in the access control rule storage unit 3400 for which high physical security is maintained.

Further, since the XML data storage unit 3300 and the access control rule storage unit 3400 are separately provided, the access control rule need only be written as a tagged object, and need not especially be written in XML. Further, when the access control rule is written as a binary tagged object, the high-speed access control process can be performed.

Advantages of the Invention

As is described above, according to the access control system of the present invention, since an access control rule for data and an access control rule for an access control rule can be handled without distinguishing between them, access control for the access control rule can be flexibly exercised in the same manner as is the access control for the data. Therefore, it is easy to exercise access control whereby an arbitrary part of an access right for an access control rule can be provided for a user. Further, the addition, changing and the deletion of the access control rule can be easily performed.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after either or both of the following conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. An access control rule generation method, for generating an access control rule for controlling another access control relative to an access request for an object that is an information resource, comprising the steps of:

receiving a request for generating an access control rule;

upon the receipt of the request for generating an access control rule, extracting said object and the access control rule for said object, wherein said access control rule includes designation information specifying a higher level control rule used for access control, wherein said higher level control rule is a rule permitting one part of an access right for said access control rule to be provided for a specific subject;

extracting an access control tagged object that represents the access control rule for the object;

determining, based on said access control rule relative to said generation request, whether said generation request should be granted; and generating said access control rule, when said generation request is granted, in accordance with said generation request, and adding information to said access control rule that, relative to said generation request, designates said access control rule;

performing one of generating, changing and deleting said access control rule and said higher level control rule thereof, in accordance with an access request that is granted;

storing a set of access control rules in computer readable memory as objects in an object storage unit, the access control rules including the access control rule, and the access control rule defining an access right for the access control rule; and managing a correlation between a target object for which an access request is issued and an access control rule for said target object.

2. An access control rule generation method, for generating an access control rule for controlling another access control relative to an access request for an object that is an information resource, comprising the steps of:
receiving a request for generating an access control rule;
extracting an access control tagged object that represents the access control rule for the object by a computer;
determining, based on said access control rule relative to said generation request, whether said generation request should be granted; and
generating said access control rule, when said generation request is granted, in accordance with said generation request, and adding information to said access control rule that, relative to said generation request, designates said access control rule.

3. The access control rule generation method according to claim 2, wherein, upon the receipt of the request for generating an access control rule, extracting said object and the access control rule for said object.

4. The access control rule generation method according to claim 2, further comprising storing a set of access control rules as objects in said object storage unit, the access control rules including the access control rule, and the access control rule defining an access right for the access control rule.

5. The access control rule generation method according to claim 2, further comprising managing a correlation between an object for which an access request is issued and an access control rule for said object.

6. The access control rule generation method according to claim 2, wherein said access control rule includes designation information specifying a higher level control rule used for access control.

7. The access control rule generation method according to claim 6, further comprising performing one of generating, changing and deleting said access control rule and said higher level control rule thereof in accordance with an access request that is granted.

8. The access control rule generation method according to claim 6, wherein said higher level control rule is a rule permitting one part of an access right for said access control rule to be provided for a specific subject.

9. A computer-readable program embodied in computer readable memory, the computer-readable program permits said computer to perform processes comprising:
a process for receiving a request for generating an access control rule that defines an access right for predetermined specific information resource;
a process for extracting an access control tagged object that represents the access control rule for the object;
a process for determining, based on said access control rule relative to said generation request, whether said generation request should be granted; and
a process for generating said access control rule, when said generation request is granted, in accordance with said generation request, and adding information to said access control rule that, relative to said generation request, designates said access control rule.

10. The computer-readable program according to claim 9, further comprising a process for storing a set of access control rules as objects in said object storage unit, the access control rules including the access control rule, and the access control rule defining an access right for the access control rule.

11. The computer-readable program according to claim 9, further comprising managing a correlation between an object for which an access request is issued and an access control rule for said object.

12. The computer-readable program according to claim 9, wherein said access control rule includes designation information specifying a higher level control rule used for access control.

13. The computer-readable program according to claim 12, further comprising performing one of generating, changing and deleting said access control rule and said higher level control rule thereof, in accordance with an access request that is granted.

14. The computer-readable program according to claim 12, wherein said higher level control rule is a rule permitting one part of an access right for said access control rule to be provided for a specific subject.

15. A program transmission apparatus comprising:
computer readable memory storing a computer readable program, which permits said computer to perform:
a process for receiving a request for generating an access control rule that defines an access right for predetermined specific information resource;
a process for extracting an access control tagged object that represents the access control rule for the object;
a process for determining, based on said access control rule relative to said generation request, whether said generation request should be granted;
a process for generating said access control rule, when said generation request is granted, in accordance with said generation request, and adding information to said access control rule that, relative to said generation request, designates said access control rule; and
transmission means for reading said program from said computer readable memory and for transmitting said program.

16. The program transmission apparatus according to claim 15, further comprising a process for storing a set of access control rules as objects in said object storage unit, the access control rules including the access control rule, and the access control rule defining an access right for the access control rule.

17. The program transmission apparatus according to claim 15, further comprising managing a correlation between an object for which an access request is issued and an access control rule for said object.

18. The program transmission apparatus according to claim 15, wherein said access control rule includes designation information specifying a higher level control rule used for access control.

19. The program transmission apparatus according to claim 18, further comprising performing one of generating, changing and deleting said access control rule and said higher level control rule thereof, in accordance with an access request that is granted.

20. The program transmission apparatus according to claim 18, wherein said higher level control rule is a rule permitting one part of an access right for said access control rule to be provided for a specific subject.

* * * * *